United States Patent

Terada et al.

[11] Patent Number: 5,990,247
[45] Date of Patent: Nov. 23, 1999

[54] BASE AND SOLVENT-DECOMPOSED MOLDING OF THERMOSETTING RESIN AND ALIPHATIC POLYESTER

[75] Inventors: Takahiko Terada, Nara; Hiroshi Onishi, Hirakata, both of Japan

[73] Assignee: Matsushita Electric Industrial Co., Ltd., Kadoma, Japan

[21] Appl. No.: 09/031,404

[22] Filed: Feb. 26, 1998

Related U.S. Application Data

[62] Division of application No. 08/578,572, filed as application No. PCT/JP95/00816, Apr. 26, 1995, Pat. No. 5,814,412.

[30] Foreign Application Priority Data

Apr. 27, 1994 [JP] Japan .................................. 6-89599
Apr. 28, 1994 [JP] Japan .................................. 6-91752

[51] Int. Cl.⁶ ............................ B32B 15/08; C08L 67/04; C08L 67/06
[52] U.S. Cl. .......................... 525/415; 29/403.3; 310/43; 310/208; 525/49; 525/415; 525/425; 525/438; 525/440; 525/442; 525/443; 428/458
[58] Field of Search ........................... 29/403.3; 310/43, 310/208; 428/458; 525/49, 415, 425, 438, 440, 442, 443

[56] References Cited

U.S. PATENT DOCUMENTS

| | | |
|---|---|---|
| 4,039,568 | 8/1977 | Sakai et al. . |
| 4,128,527 | 12/1978 | Kinjo et al. .......................... 260/42.18 |
| 4,663,429 | 5/1987 | Murai et al. ............................. 528/355 |
| 5,127,958 | 7/1992 | Personette .................................. 134/2 |
| 5,468,780 | 11/1995 | Kubota et al. .......................... 525/438 |

FOREIGN PATENT DOCUMENTS

| | | |
|---|---|---|
| 0650813 | 5/1995 | European Pat. Off. . |
| 61-214740 | 9/1936 | Japan . |
| 52-137601 | 11/1977 | Japan . |
| 53-108153 | 9/1978 | Japan . |
| 53-108193 | 9/1978 | Japan . |
| 56-89887 | 7/1981 | Japan . |
| 61-115933 | 6/1986 | Japan . |
| 61-123657 | 6/1986 | Japan . |
| 61-214740 | 9/1986 | Japan . |
| 62-267355 | 11/1987 | Japan . |
| 63-43947 | 2/1988 | Japan . |
| 1-229882 | 9/1989 | Japan . |
| 3-192108 | 8/1991 | Japan . |
| 3-192153 | 8/1991 | Japan . |
| 5-043781 | 2/1993 | Japan . |
| 90-59393 | 3/1997 | Japan . |

*Primary Examiner*—Robert E. Sellers
*Attorney, Agent, or Firm*—Renner, Otto, Boisselle & Sklar, PLL

[57] ABSTRACT

The thermosetting composition of the present invention includes an unsaturated polyester, an addition polymerizable monomer, a low shrink agent other than an aliphatic polyester, and an aliphatic polyester decomposed in a decomposing solution containing a base and at least one solvent selected from the group consisting of water, methanol, ethanol, and ethylene glycol at a temperature lower than a boiling point of the decomposing solution after being cured.

9 Claims, 2 Drawing Sheets

BASE AND SOLVENT-DECOMPOSED MOLDING OF THERMOSETTING RESIN AND ALIPHATIC POLYESTER

This application is a divisional of application Ser. No. 08/578,572 filed Dec. 21, 1995, U.S. Pat. No. 5,814,412 and a 371 of PCT/JP95/00816 filed Apr. 26, 1995 Oct. 5, 1995.

DESCRIPTION

1. Technical Field

The present invention relates to a thermosetting composition with superior strength and heat resistance, readily decomposed, a molding compound containing the composition, a molded structure using the molding compound, and a method for decomposing the composition, the molding compound, and the molded structure.

2. Background Art

Conventionally, thermosetting resins have been widely utilized for industrial materials. The volume of production of the thermosetting resins has increased at a rate of several percent per annum since 1985, and reached about 2,000,000 tons during the full year of 1990. Examples of the thermosetting resins include an epoxy resin, a phenol resin, a polyurethane resin, an unsaturated polyester resin, a urea resin, a melamine resin, and a polyimide resin. Such thermosetting resins mostly find their application in composite materials containing a filler, such as fiber reinforced plastics (FRP). For example, about 80% of produced unsaturated polyester resins have been used as FRP. In addition to glass fibers, examples of fillers contained in the composite materials include inorganic materials such as calcium carbonate, talc, and silica, and organic materials such as pulp and wood. Since the thermosetting resins are readily reinforced by being composited with a filler or the like, they have widely been used for consumer products or for industrial products such as materials for molding, multilayer plates, adhesives, and coatings.

When being cured, the thermosetting resins have a three-dimensional cross-linked structure and generally assume an insoluble and infusible solid form, so that they are difficult to be decomposed for disposal. Thus, the thermosetting resins have conventionally been junked because of their difficulty in reproduction and recycling.

However, in recent years, waste problems have received heightened attention, and the decomposition and reproduction of waste resins have been recognized as serious problems. Such problems are also important with respect to the thermosetting resins. For example, fiber reinforced unsaturated polyesters have been used a lot for producing large products such as a fishing boat, a tank, and housing equipment, causing serious problems of decomposition and recycling of waste. This necessitates technical development for minimizing the volume of waste thermosetting resins and recycling thereof. As a result, the technique for thermally decomposing the waste thermosetting resins into raw materials has been studied. However, the thermosetting resins are technically difficult to be decomposed for disposal, because of their properties such as hardness, strength, heat resistance, frame resistance, and chemical resistance. Furthermore, the thermosetting resins are mostly used as structural materials because of their outstanding strength; for example, they are used for molding compounds for motors. In this case, the resulting waste thermosetting resins may include other materials such as metal. Such materials as metal are more expensive than the thermosetting resins. As is understood from this fact, there arises a serious problem that less expensive waste resins have prevented the expensive materials such as metal from being reproduced or recycled. Thus, waste problems with respect to the thermosetting resins cannot be dissolved by using conventionally available resins or by using conventional methods for decomposing for disposal.

On the other hand, in recent years, molded structures obtained by integrally molding a molding compound made of a thermosetting resin, such as molded motors, molded transformers, and IC packages have been used in consumer, industrial, and paperwork equipment, and the like. Hereinafter, an example of the molded motor will be described. Such molded motors have outstanding properties in terms of noise, damping, insulation, and maintenance, and their compact size facilitates the automation thereof. Because of these properties, the demand for molded motors has rapidly increased.

Conventionally used molded stators of molded motors used as AC motors, brushless DC motors, etc. generally have a structure disclosed, for example, in Japanese Laid-Open Patent Publication No. 61-214740. Such a structure will be described with reference to FIGS. 7 and 8. FIG. 7 is a perspective view showing an external appearance of a molded motor with a conventional molded stator 201; FIG. 8 is a perspective view showing a structure of a stator portion before being molded. As shown in FIG. 7, the molded motor includes a motor portion 220 and the molded stator 201 integrally molded so that the stator portion of FIG. 8 is covered with a molding compound 202. The stator portion, as shown in FIG. 8, has a coil 203, an iron core 204, and an insulator 207. The insulator 207 has a printed board 211 with a coil pattern 210 at one part thereof. On the printed board 211, end portions of the coil 203 are connected to leads 212 so that a signal is input to the coil 203 through the end portions thereof. The molding compound 202 contains, as a binder, a thermoplastic resin such as polyethyleneterephthalate, polyethylene, polypropylene and nylon, or a thermosetting resin such as an unsaturated polyester, a vinyl ester resin and a phenol resin, and contains, as an additive, calcium carbonate, talc, or carbon black.

At the disposal of the molded motor, it is desired that the molding compound 202 is removed from the molded motor, and the remaining metals such as the iron core 204 and the coil 203 are recycled. According to the conventional waste disposal, the molding compound is first shredded with a shredder, and the iron core and the coil are picked up from the shredded molding compounds for recycling. However, the molded motors as described above are likely to damage the teeth of the shredder with their iron cores and/or the coils. This stands in the way of disposing of such molded motors and results in having to bury the molded motors together with the iron cores and the coils in the land. The molding compounds as described above are not naturally decomposed while being buried in the land, so that silicon steel plates and copper wires used for the iron cores and the coils remain buried without being recycled, even though they still keep great value after being used. Furthermore, the thermosetting resins used as the molding compounds cannot be subject to the conventional decomposing method, such as a method for minimizing the volume of waste thermosetting resins by thermal decomposition. Thus, the conventional molded motors have problems that they cannot be disposed by shredding or decomposing the molding compounds, and valuable things such as the iron cores and the coils cannot be kept for recycling at the time of the disposal of the molded motors. Other molded structures such as molded transformers also have the same problems as the above.

As described above, considering the decomposition of large waste resins for disposal and the recycling of expensive materials such as metals included in molded motors, there is a strong demand for thermosetting resins or thermosetting compositions, which can retain outstanding conventional characteristics and can be readily decomposed.

DISCLOSURE OF INVENTION

A first thermosetting composition of the present invention includes a thermosetting resin and an aliphatic polyester, wherein decomposition of the thermosetting composition is promoted by decomposition of the aliphatic polyester in a decomposing solution containing at least a base after the thermosetting composition is cured.

A second thermosetting composition of the present invention includes an unsaturated polyester, an addition polymerizable monomer, a low shrink agent other than an aliphatic polyester, and an aliphatic polyester, and is capable of being readily decomposed in a decomposing solution containing a base and at least one solvent selected from the group consisting of water, methanol, ethanol, and ethylene glycol at a temperature lower than a boiling point of the decomposing solution after being cured.

A third thermosetting composition of the present invention includes an unsaturated polyester, an addition polymerizable monomer, and polycaprolactone, and is capable of being readily decomposed in a decomposing solution containing a base and at least one solvent selected from the group consisting of water, methanol, ethanol, and ethylene glycol at a temperature lower than a boiling point of the decomposing solution after being cured.

In a preferred embodiment, at least part of the addition polymerizable monomer is an aliphatic polyester having an addition polymerizable terminal.

A fourth thermosetting composition of the present invention includes an aliphatic polyester, and a phenol resin or an epoxy resin, and is capable of being readily decomposed in a decomposing solution containing a base and at least one solvent selected from the group consisting of water, methanol, ethanol, and ethylene glycol at a temperature lower than a boiling point of the decomposing solution after being cured.

In a preferred embodiment, the aliphatic polyester contained in the first, second, and fourth thermosetting compositions is at least one aliphatic polyester selected from the group consisting of polycaprolactone, polypropiolactone, polyglycolic acid, polylactic acid, polyethylene adipate, polybutylene adipate, polytetramethylene adipate, polyethylene succinate, polybutylene succinate, polycaprolactonediol, polycaprolactonetriol, and poly(3-hydroxyalcanoate); and the third thermosetting composition further contains such aliphatic polyesters other than polycaprolactone.

A first molding compound of the present invention includes as a binder a thermosetting composition containing a thermosetting resin and an aliphatic polyester, wherein decomposition of the thermosetting composition is promoted by decomposition of the aliphatic polyester in a decomposing solution containing at least a base after the thermosetting composition is cured.

A second molding compound of the present invention includes as a binder a thermosetting composition containing an unsaturated polyester, an addition polymerizable monomer, a low shrink agent other than an aliphatic polyester, and an aliphatic polyester, wherein the thermosetting composition is capable of being readily decomposed in a decomposing solution containing a base and at least one solvent selected from the group consisting of water, methanol, ethanol, and ethylene glycol at a temperature lower than a boiling point of the decomposing solution after being cured.

A third molding compound of the present invention includes as a binder a thermosetting composition containing an unsaturated polyester, an addition polymerizable monomer, and polycaprolactone, wherein the thermosetting composition is capable of being readily decomposed in a decomposing solution containing a base and at least one solvent selected from the group consisting of water, methanol, ethanol, and ethylene glycol at a temperature lower than a boiling point of the decomposing solution after being cured.

A fourth molding compound of the present invention includes as a binder an aliphatic polyester, and a phenol resin or an epoxy resin, wherein the thermosetting composition is capable of being readily decomposed in a decomposing solution containing a base and at least one solvent selected from the group consisting of water, methanol, ethanol, and ethylene glycol at a temperature lower than a boiling point of the decomposing solution after being cured.

In a preferred embodiment, the addition polymerizable monomer contained in the thermosetting composition of the above-mentioned second and third molding compounds is styrene.

In a preferred embodiment, the aliphatic polyester contained in the thermosetting composition of the above-mentioned first, second, and fourth molding compounds is at least one aliphatic polyester selected from the group consisting of polycaprolactone, polypropiolactone, polyglycolic acid, polylactic acid, polyethylene adipate, polybutylene adipate, polytetramethylene adipate, polyethylene succinate, polybutylene succinate, polycaprolactonediol, polycaprolactonetriol, and poly(3-hydroxyalcanoate); and the thermosetting composition of the third molding compound further contains such aliphatic polyesters other than polycaprolactone.

A first molded structure of the present invention includes a molded portion made of a molding compound, integrally molded containing at least metals, wherein at least part of the molding compound includes as a binder a thermosetting composition containing a thermosetting resin and an aliphatic polyester, decomposition of the thermosetting composition is promoted by decomposition of the aliphatic polyester in a decomposing solution containing at least a base after the thermosetting composition is cured, and the metals and the molding compound are capable of being readily separated.

A second molded structure of the present invention includes a molded portion made of a molding compound, integrally molded containing at least metals, wherein at least part of the molding compound includes as a binder a thermosetting composition containing an unsaturated polyester, an addition polymerizable monomer, a low shrink agent other than an aliphatic polyester, and an aliphatic polyester, the thermosetting composition is readily decomposed in a decomposing solution containing a base and at least one solvent selected from the group consisting of water, methanol, ethanol, and ethylene glycol at a temperature lower than a boiling point of the decomposing solution after being cured, and the metals and the molding compound are capable of being readily separated.

A third molded structure of the present invention includes a molded portion made of a molding compound, integrally molded containing at least metals, wherein at least part of the molding compound includes as a binder an unsaturated polyester, an addition polymerizable monomer, and polycaprolactone, the thermosetting composition is capable being readily decomposed in a decomposing solution containing a base and at least one solvent selected from the group consisting of water, methanol, ethanol, and ethylene glycol at a temperature lower than a boiling point of the decomposing solution after being cured, and the metals and the molding compound are capable of being readily separated.

A fourth molded structure of the present invention includes a molded portion made of a molding compound, integrally molded containing at least metals, wherein at least part of the molding compound includes as a binder a thermosetting composition containing an aliphatic polyester, and a phenol resin or an epoxy resin, the thermosetting composition is capable being readily decomposed in a decomposing solution containing a base and at least one solvent selected from the group consisting of water, methanol, ethanol, and ethylene glycol at a temperature lower than a boiling point of the decomposing solution after being cured, and the metals and the molding compound are capable of being readily separated.

In a preferred embodiment, the aliphatic polyester contained in the thermosetting composition of the above-mentioned first, second, and fourth molded structures is at least one aliphatic polyester selected from the group consisting of polycaprolactone, polypropiolactone, polyglycolic acid, polylactic acid, polyethylene adipate, polybutylene adipate, polytetramethylene adipate, polyethylene succinate, polybutylene succinate, polycaprolactonediol, polycaprolactonetriol, and poly(3-hydroxyalcanoate), and the thermosetting composition of the third molded structure further contains such aliphatic polyesters other than polycaprolactone.

In a preferred embodiment, at least part of the above-mentioned aliphatic polyester is dispersed in the molded portion as a filler in fiber form, needle form, or particle form.

The fifth molded structure of the present invention includes a molded portion made of a molding compound, integrally molded containing at least metals, wherein the molded portion includes an inner molded portion covering the metals and an outer molded portion which is provided outside the inner molded portion and whose outermost portion defines an outermost portion of the molded structure, and the inner molded portion contains an aliphatic polyester as a main component.

In a preferred embodiment, the above-mentioned outer molded portion contains each of the above-mentioned thermosetting compositions as a main component.

In a preferred embodiment, the above-mentioned metals are coils and the above-mentioned molded structure are used for a motor.

In a preferred embodiment, the above-mentioned molded structure includes a molded portion made of a molding compound, integrally molded containing the coil, an insulator, and an iron core, wherein a part of the insulator penetrates the molded portion to be exposed to a surface of the molded portion.

In a preferred embodiment, the above-mentioned insulator is made of an aliphatic polyester.

A sixth molded structure of the present invention includes a molded portion made of a molding compound, integrally molded containing at least metals, wherein at least part of the molding compound contains as a binder a thermosetting composition containing an unsaturated polyester, styrene, polycaprolactone, and an aliphatic polyester, the aliphatic polyester is at least one selected from the group consisting of polypropiolactone, polyglycolic acid, polylactic acid, polyethylene adipate, polybutylene adipate, polytetramethylene adipate, polyethylene succinate, polybutylene succinate, polycaprolactonediol, polycaprolactonetriol, and poly(3-hydroxyalcanoate), the thermosetting composition is capable of being readily decomposed in a decomposing solution containing a base and at least one solvent selected from the group consisting of water, methanol, ethanol, and ethylene glycol at a temperature lower than a boiling point of the decomposing solution after being cured, and the metals and the molding compound are capable of being readily separated.

A method for decomposing a thermosetting composition of the present invention includes the step of soaking the thermosetting composition in a decomposing solution containing a base and at least one solvent selected from the group consisting of water, methanol, ethanol, and ethylene glycol, wherein the thermosetting composition contains at least an aliphatic polyester and a thermosetting resin.

A method for decomposing a molding compound containing as a binder a thermosetting composition of the present invention includes the step of soaking the molding compound in a decomposing solution containing a base and at least one solvent selected from the group consisting of water, methanol, ethanol, and ethylene glycol, wherein the thermosetting composition contains at least an aliphatic polyester and a thermosetting resin.

A first method for decomposing a molded structure of the present invention includes the step of soaking the molded structure in a decomposing solution containing a base and at least one solvent selected from the group consisting of water, methanol, ethanol, and ethylene glycol, wherein the molded structure includes a molded portion made of a molding compound, integrally molded containing at least metals, and at least part of the molding compound includes as a binder a thermosetting composition containing at least an aliphatic polyester and a thermosetting resin.

A second method for decomposing a molded structure of the present invention is a method for decomposing a molded structure including a molded portion made of a molding compound, integrally molded containing at least metals, the molded portion including an inner molded portion covering the metals and an outer molded portion which is provided outside the inner molded portion and whose outermost portion defines an outermost portion of the molded structure, the inner molded portion containing an aliphatic polyester as a main component, the method including the steps of: exposing at least part of the inner molded portion by cutting or opening; and soaking the molded structure in a good solvent with respect to the aliphatic polyester or in a decomposing solution containing a base and at least one solvent selected from the group consisting of water, methanol, ethanol, and ethylene glycol.

In a preferred embodiment, the above-mentioned decomposing solution further contains at least one solvent selected from the group consisting of acetone, 2-butanone, dimethylformamide, dimethyl sulfoxide, dioxane, tetrahydrofuran, diethyl ether, diethylene glycol, diethylene glycol monoester, diethylene glycol diester, dicarboxylic acid diester, methyl acetate, ethyl acetate, benzene, toluene, and phenol.

In a preferred embodiment, according to a method for decomposing a thermosetting composition, a molding compound, and a molded structure of the present invention, the above-mentioned thermosetting composition, molding compound, or molded structure is soaked in the above-mentioned decomposing solution at a temperature lower then a boiling point of the decomposing solution.

A method for recycling a molded structure of the present invention is a method for recycling a molded structure including a molded portion made of a molding compound, integrally molded containing at least metals, wherein at least part of the molding compound contains as a binder a thermosetting composition containing at least an aliphatic polyester and a thermosetting resin, the method including the steps of: soaking the molded structure in a decomposing solution containing a base and at least one solvent selected from the group consisting of water, methanol, ethanol, and ethylene glycol so as to chemically decompose the molded portion to a degree that a form of the molded portion cannot be maintained; and separating the metals from the decomposed molded portion and recovering the metals.

In a preferred embodiment, the above-mentioned molded structure is soaked in the above-mentioned decomposing solution at a temperature lower than a boiling point of the decomposing solution.

In a preferred embodiment, the above-mentioned metals are coils, and the above-mentioned structure is a motor.

BEST MODE FOR CARRYING OUT THE INVENTION

Figure 1:
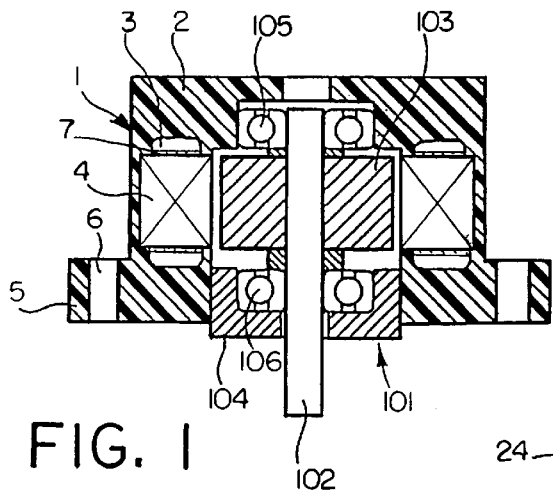
FIG. 1 is a cross-sectional view showing an embodiment of a molded motor which is an example of a molded structure of the present invention.

In the present specification, "a thermosetting composition contains an aliphatic polyester" refers to: (1) a thermosetting composition contains an aliphatic polyester as one component; and (2) a thermosetting composition contains a polymer having an aliphatic polyester portion. Furthermore, addition polymerizable monomers are a component used in addition polymerization, and include aliphatic polyesters having addition polymerizable groups at their molecular terminals.

The first thermosetting composition of the present invention contains a thermosetting resin and an aliphatic polyester, and its decomposition is promoted by decomposition of the aliphatic polyester in a decomposing solution containing at least a base after being cured.

The second thermosetting composition of the present invention contains an unsaturated polyester, an addition polymerizable monomer, a low shrink agent other than an aliphatic polyester, and an aliphatic polyester, and is capable of being readily decomposed in a decomposing solution containing a base, and at least one solvent selected from the group consisting of water, methanol, ethanol, and ethylene glycol at a temperature lower than a boiling point of the decomposing solution after being cured.

The third thermosetting composition of the present invention contains an unsaturated polyester, an addition polymerizable monomer, and polycaprolactone, and is capable of being readily decomposed in a decomposing solution containing a base, and at least one solvent selected from the group consisting of water, methanol, ethanol, and ethylene glycol at a temperature lower than a boiling point of the decomposing solution after being cured.

The fourth thermosetting composition of the present invention contains an aliphatic polyester, and a phenol resin or an epoxy resin, and is capable of being readily decomposed in a decomposing solution containing a base and at least one solvent selected from the group consisting of water, methanol, ethanol, and ethylene glycol at a temperature lower than a boiling point of the decomposing solution after being cured.

Examples of the thermosetting resin contained in the first thermosetting composition of the present invention include an unsaturated polyester, an epoxy resin, a phenol resin, a polyurethane resin, a melamine resin, a urea resin, and a polyimide resin. The unsaturated polyester, epoxy resin, and phenol resin also can be preferably used for the other thermosetting compositions of the present invention described later.

These thermosetting resins have condensation bonds in their molecular backbone. Here, the condensation bond refers to a portion formed by condensation in a thermosetting resin molecular chain; for example, it refers to an ester bond portion in the case of an unsaturated polyester and a methylene group portion in the case of a phenol resin.

The unsaturated polyesters contained in the first thermosetting composition as well as in the second and third thermosetting compositions of the present invention can be obtained by well-known condensation polymerization of unsaturated and saturated polybasic acids and glycols. Examples of the unsaturated polybasic acid include maleic acid, fumaric acid, itaconic acid, and citraconic acid, and anhydrides thereof. Examples of the saturated polybasic acid include phthalic acid, isophthalic acid, terephthalic acid, adipic acid, sebacic acid, tetrahydrophthalic acid, methyl tetrahydrophthalic acid, endomethylene tetrahydrophthalic acid, chlorendic acid, and tetrabromophthalic acid, and anhydrides thereof. Examples of the glycol include ethylene glycol, propylene glycol, diethylene glycol, dipropylene glycol, neopentyl glycol, 1,3-butanediol, 1,6-hexanediol, hydrogenated bisphenol A, a bisphenol A propylene oxide compound, and dibromoneopentyl glycol.

Examples of the preferred unsaturated polyester include copolymers of isophthalic acid, fumaric acid and neopentyl glycol as represented by the following Formula I; copolymers of phthalic anhydride, fumaric anhydride, and propylene glycol as represented by Formula II; and copolymers of isophthalic acid, maleic anhydride, and propylene glycol as represented by Formula III.

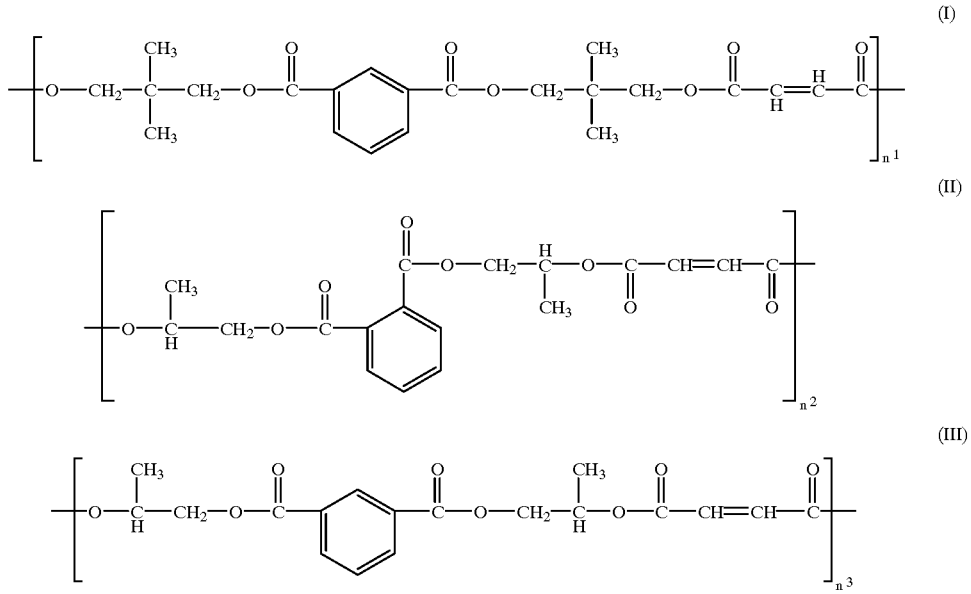

where $n^1$ to $n^3$ are independently 1 to 30.

The mixing molar ratio between the unsaturated polybasic acid and the saturated polybasic acid is preferably in the range of 30/70 to 70/30, and more preferably in the range of 40/60 to 60/40. In the case where the thermosetting composition contains the unsaturated polybasic acid and the saturated polybasic acid in these ranges, it has outstanding mechanical strength and decomposing property after being cured. This is because an ester bond of the saturated polybasic acid is readily decomposed in a decomposing solution and an unsaturated bond (crosslinking junctions) contributing to mechanical strength of the cured composition are present in a preferred ratio.

For practical use, the above-mentioned unsaturated polyesters are provided as solution products in which the unsaturated polyesters are dissolved in polymerizable monomers and are called unsaturated polyester resins.

Examples of the addition polymerizable monomer used in the present invention include styrene, vinyl toluene, α-methylstyrene, methyl methacrylate, vinyl acetate, diallyl phthalate, diallyl isophthalate, diallyl tetrabromophthalate, phenoxyethyl acrylate, 2-hydroxyethyl acrylate, and 1,6-hexanediol diacrylate. Furthermore, aliphatic polyesters having an addition polymerizable terminal can be used as the addition polymerizable monomer. Considering a curing property, easiness of viscosity control, cost, and the like, styrene is preferred.

The above-mentioned addition polymerizable monomer is contained in the thermosetting composition preferably in an amount of about 25 to about 150 parts by weight based on 100 parts by weight of the above-mentioned unsaturated polyester, more preferably in an amount of about 30 to about 120 parts by weight, and most preferably in an amount of about 40 to about 100. When the content of the addition polymerizable monomer is less than about 25 parts by weight, the resulting first and second thermosetting compositions are not provided with sufficient curing property; thus, the mechanical strength of the cured compositions decreases. When the content of the addition polymerizable monomer is more than about 150 parts by weight, a decomposing solution cannot sufficiently permeate the cured compositions; thus, the cured compositions are not readily decomposed. When the addition polymerizable monomer is contained in the thermosetting composition in an amount of the above range, the shrinkage of the composition during curing can be minimized.

Furthermore, in the preferred embodiment of the present invention, as the addition polymerizable monomer, aliphatic polyesters having an addition polymerizable terminal can be used. In the case where an aliphatic polyester portion of the addition polymerizable monomer is the same kind as that of aliphatic polyesters of the thermosetting compositions, the compatibility between the addition polymerizable monomer and the low shrink agent is very satisfactory, resulting that uncured compositions have outstanding stability in a liquid state. Furthermore, in the case where the aliphatic polyester having an addition polymerizable terminal is used as the addition polymerizable monomer, the content and curing conditions of the composition can be varied depending upon the molecular weight of the aliphatic polyester.

Examples of the low shrink agent used in the present invention include thermoplastic resins such as polyethylene, polypropylene, polystyrene, polyvinylacetate, polymethylmethacrylate, poly(ethylene vinylalcohol), acrylic copolymers, methacrylic copolymers, a styrene-butadiene block copolymer, and an acrylonitrile-butadiene-styrene copolymer.

The low shrink agent is contained in the thermosetting composition preferably in an amount of about 1 to about 100 parts by weight based on 100 parts by weight of the above-mentioned unsaturated polyester, more preferably in an amount of about 1 to about 50 parts by weight, and most preferably in an amount of about 1 to about 20 parts by weight. When the content of the low shrink agent is less than about 1 part by weight, the low shrinking property, i.e., moldability of the composition decreases. When the content of the low shrink agent is more than about 100 parts by weight, the mechanical strength of the composition decreases.

The aliphatic polyesters used in the present invention are thermoplastic saturated polyesters. Such polyesters are very easily decomposed in the decomposing solution described later. Examples of the aliphatic polyester include polymers obtained by ring-opening polymerization of lactones such as polycaprolactone represented by Formula IV and polypropiolactone; polymers of hydroxy acids such as polylactic acid represented by Formula V and polyglycolic acid represented by Formula VI; copolymers of glycols and aliphatic dicarboxylic acids represented by Formula VII such as polyethylene adipate, polytetramethylene adipate, polyethylene succinate, and polybutylene succinate; polymers having at least one functional group at their molecular terminals such as polycaprolactonediol represented by Formula VIII and polycaprolactonetriol represented by Formula IX; polycaprolactone having a terminal acrylate portion represented by Formula X; and poly(3-hydroxyalcanoate) obtained by fermentation of microorganisms, such as poly(3-hydroxypropionate), poly(3-hydroxybutylate), poly(3-hydroxyvalerate), and poly(3-hydroxyoctanoate). Considering stability of the thermosetting composition in a liquid state, dispersibility, and decomposing ability of the cured composition in a decomposing solution, polycaprolactone, polycaprolactonediol, polycaprolactonetriol, and polylactic acid are preferred.

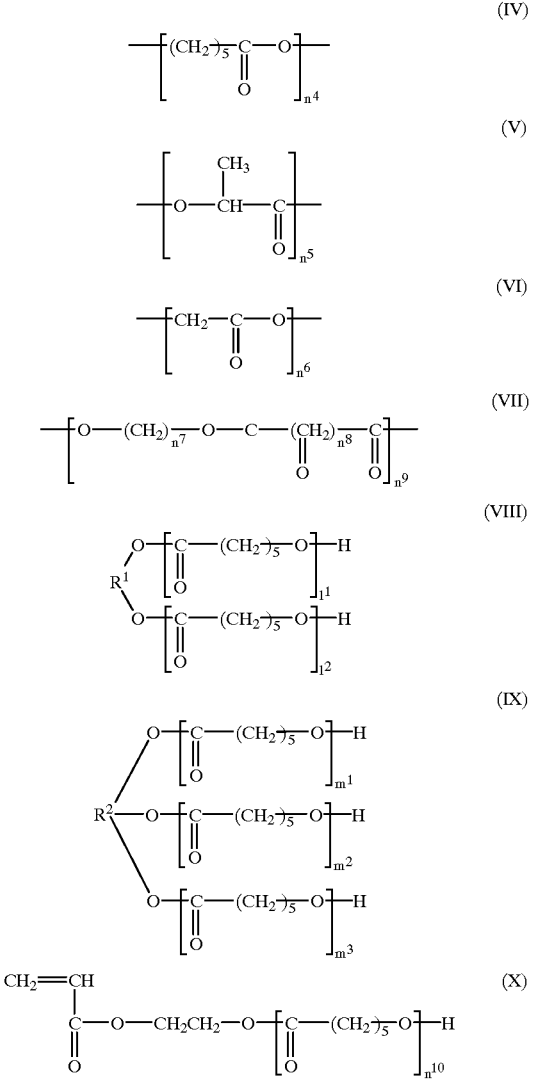

where $n^4$ to $n^{10}$, $\iota^1$ to $\iota^2$, and $m^1$ to $m^3$ are independently 10 to 2,000; and $R^1$ and $R^2$ are independently hydrocarbon groups having carbon atoms of 1 to 20.

In the case of the thermosetting composition containing the above-mentioned thermosetting resin and the above-mentioned aliphatic polyester, the aliphatic polyester is contained in the thermosetting compositions preferably in an amount of about 1 to about 100 parts by weight based on 100 parts by weight of the thermosetting resin, more preferably in an amount of about 2 to about 50 parts by weight, and most preferably in an amount of about 3 to about 20 parts by weight. When the content of the aliphatic polyester is less than about 1 part by weight, the resulting compositions are not sufficiently decomposed in a decomposing solution. When the content of the aliphatic polyester is more than about 100 parts by weight, the mechanical strength of the cured compositions decreases.

In the case of the thermosetting composition containing the above-mentioned unsaturated polyester and the above-mentioned aliphatic polyester, the aliphatic polyester is contained in the thermosetting composition preferably in an amount of 1 to 100 parts by weight based on 100 parts by weight of the unsaturated polyester, more preferably in an amount of 2 to 50 parts by weight, and most preferably in an amount of 3 to 20 parts by weight. When the content is less than 1 part by weight, the resulting compositions are not sufficiently decomposed in a decomposing solution. When the content is more than 100 parts by weight, the mechanical strength of the cured composition decreases.

Furthermore, as described later, in the case where a filler is added to the thermosetting composition to prepare a molding compound, the above-mentioned aliphatic polyester is preferably contained in a slightly greater amount than the case where the filler is not added. This is because the aliphatic polyester can be sufficiently dispersed in an increased space caused by the addition of the filler. For example, a thermosetting composition prepared by adding 5 parts by weight of the aliphatic polyester to 100 parts by weight of a mixture containing the aliphatic polyester and the addition polymerizable monomer will be described. In the case where 150 parts by weight of calcium carbonate are added to the thermosetting composition to prepare a molding compound, the aliphatic polyester is added in an amount of 7.7 parts by weight instead of 5 parts by weight based on 100 parts by weight of the mixture. The reason for this is that calcium carbonate has a specific gravity of 2.7, which increases the volume of the molding compound by about 55.6 volume parts (=150/2.7). Thus, in order for the aliphatic polyester to disperse in the molding compound in the same way as in the case before the increase in volume of the molding compound, another 2.7 parts by weight (5*55.6/100) of the aliphatic polyester should be added.

The phenol resin used in the present invention can be obtained by polymerizing phenols with formaldehyde by a known method. The phenol resins are classified into novolak resins obtained in the presence of an acidic catalyst and resol resins obtained in the presence of an alkali catalyst. The novolak resins are cured by being heated with a curing agent, and the resol resins are cured merely by being heated. In the present invention, the novolak resins are preferred. Furthermore, in the present invention, phenol resins having an aliphatic polyester portion at a side chain are also preferably used.

In the case of the thermosetting composition containing the above-mentioned phenol resin and the above-mentioned aliphatic polyester, the aliphatic polyester is contained in the composition preferably in an amount of 1 to 100 parts by weight based on 100 parts by weight of the phenol resin, more preferably in an amount of 1 to 50 parts by weight, and most preferably in an amount of 1 to 20 parts by weight. When the content of the aliphatic polyester is less than 1 part by weight, the resulting composition is not sufficiently decomposed in a decomposing solution. When the content of the aliphatic polyester is more than 100 parts by weight, the mechanical strength of the cured composition decreases.

Examples of the epoxy resin used in the present invention include glycidyl ether type resins, glycidyl ester type resins, glycidyl amine type resins, epoxynovolak resins, alicyclic epoxy resins, brominated epoxy resins, and aliphatic epoxy resins. Glycidyl ether type resins obtained from bisphenol A and epichlorohydrin are preferably used. Furthermore, in the present invention, epoxy resins having an aliphatic polyester portion at a side chain represented by Formula XI are preferably used.

In the case where a novolak resin is used as the above-mentioned phenol resin, the above-mentioned curing agent can be contained in the thermosetting composition preferably in an amount of about 5 to about 100 parts by weight based on 100 parts by weight of novolak resin, more preferably in an amount of about 5 to about 40 parts by weight, and most preferably in an amount of about 7 to about 20 parts by weight. These preferred contents of the curing agent can be applied in almost the same way in the case where the epoxy resin is used.

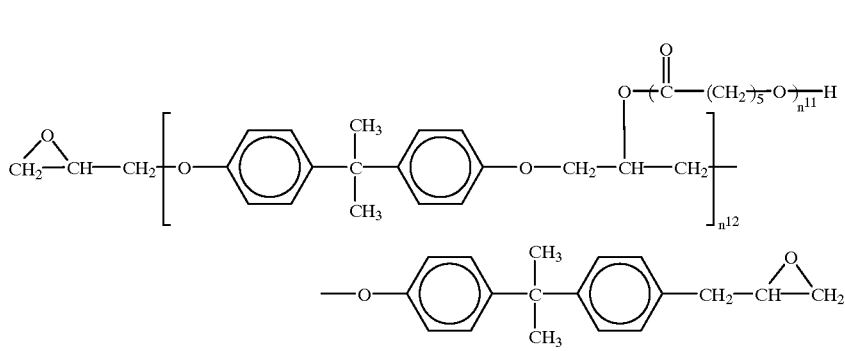

(XI)

where $n^{11}$ to $n^{12}$ are independently 1 to 30.

In the case of the thermosetting composition containing the above-mentioned epoxy resin and the above-mentioned aliphatic polyester, the aliphatic polyester is contained in the thermosetting composition preferably in an amount of about 1 to about 100 parts by weight based on 100 parts by weight of the epoxy resin, more preferably in an amount of about 1 to about 50 parts by weight, and most preferably in an amount of about 1 to about 20 parts by weight. When the content of the aliphatic polyester is less than about 1 part by weight, the resulting composition is not sufficiently decomposed in a decomposing solution. When the content of the aliphatic polyester is more than about 100 parts by weight, the mechanical strength of the cured composition decreases.

The thermosetting compositions of the present invention preferably contain a curing agent.

Examples of the curing agent of the above-mentioned unsaturated polyester include benzoyl peroxide, t-butyl perbenzoate, t-butyl peroxybenzoate, t-butyl peroxylaurate, t-butyl peroxy-2-ethylhexanoate, and t-butyl peroctoate.

The curing agent is contained in the thermosetting composition preferably in an amount of about 0.1 to about 5 parts by weight based on 100 parts by weight in total of the unsaturated polyester and the addition polymerizable monomer, more preferably in an amount of about 0.3 to about 4 parts by weight, and most preferably in an amount of about 0.5 to about 3 parts by weight. When the content is less than 0.1 parts by weight, the composition is not sufficiently cured. When the content is more than about 5 parts by weight, since the amount of the curing agent present in the three-dimensional network structure in the cured thermosetting composition is too much, the mechanical strength of the cured thermosetting composition becomes insufficient.

Examples of the curing agent of the phenol resins and the epoxy resins include benzylmethylamine, hexamethylenetetramine, methaphenylenediamine, diaminodiphenylmethane, and diaminodiphenylsulfone.

Decomposition of the thermosetting composition of the present invention is promoted when the aliphatic polyester is decomposed in a decomposing solution containing at least a base.

Preferably, the thermosetting composition of the present invention has solubility; that is, it can be readily decomposed in a decomposing solution containing a base and at least one solvent selected from the group consisting of water, methanol, ethanol, and ethylene glycol at a temperature lower than a boiling point of the decomposing solution. The decomposition of the thermosetting composition in the decomposing solution is effected as follows: Hydroxyl ions generated by the base in the solution work as a catalyst to hydrolyze ester bonds of the aliphatic polyester in the thermosetting composition and decompose condensation bonds of the thermosetting resin.

Examples of the base contained in the decomposing solution include metal hydroxides such as sodium hydroxide and potassium hydroxide; metal oxides such as sodium oxide and calcium oxide; and metal alkoxides such as sodium ethoxide and potassium t-butoxide. These bases can be used singly or in combination.

The main solvent contained in the decomposing solution can be selected from the group consisting of water, methanol, ethanol, and ethylene glycol. These can be used alone or in combination.

The decomposing solution can further contain at least one auxiliary solvent selected from the group consisting of acetone, 2-butanone, dimethylformamide, dimethyl sulfoxide, dioxane, tetrahydrofuran, diethyl ether, diethylene glycol, diethylene glycol monoester, diethylene glycol diester, dicarboxylic acid diester, methyl acetate, ethyl acetate, benzene, toluene, and phenol.

The base is contained in the decomposing solution preferably in an amount of about 0.1 to about 50% by weight, more preferably in an amount of about 1 to about 30% by weight, and most preferably in an amount of about 2 to about 20% by weight. When the content of the base is less than 0.1% by weight, the catalytic effect of the solution for hydrolyzing the composition decreases. When the content of the base is more than 50% by weight, it is difficult to prepare the decomposing solution; furthermore, the viscosity of the solution increases, so that the permeability of the solution with respect to the cured composition decreases, resulting in the decrease in decomposing ability.

The main solvent is contained in the entire solvent preferably in an amount of about 5 to about 100% by weight, more preferably in an amount of about 30 to about 90% by weight, and most preferably in an amount of about 50 to about 80% by weight. By containing the main solvent and the auxiliary solvent in these ranges, the decomposing solution has outstanding compatibility with the aliphatic polyester contained in the composition, i.e., permeability with respect to the cured composition of the decomposing solution and outstanding hydroxyl ions generating ability of the decomposing solution, i.e., ability to decompose ester bonds of the aliphatic polyester at room temperature or at a temperature equal to or lower than a boiling point of the decomposing solution. Consequently, the decomposing solution has outstanding ability to decompose the thermosetting composition.

The thermosetting composition of the present invention can be in cured or uncured form. More specifically, the thermosetting composition can assume various forms such as a layered body, a coating, a putty, and an adhesive, as well as cured moldings such as those obtained by injection molding and transfer molding. The composition in any of these forms can be decomposed in the decomposing solution.

Furthermore, moldings using the thermosetting composition of the present invention can be used at high humidities. That is, the cured composition does not have its three-dimensional structure decomposed easily with water only. Hence, it follows that the cured composition retains outstanding characteristics, e.g., mechanical strength even at high humidities.

The molding compound of the present invention contains the thermosetting composition of the present invention at least as a binder. If required, a filler, a thickener, a mold release agent, a wax, and a colorant can be added to the molding compound.

Examples of the filler include carbonates such as calcium carbonate and magnesium carbonate; sulfates such as calcium sulfate and barium sulfate; sulfites such as calcium sulfite; silicates such as clay, mica, glass balloon, montmorillonite, silicic acid, kaoline, and talc; oxides such as silica, diatomaceous earth, iron oxide, pumice, titanium oxide, and alumina; hydroxides such as aluminum hydroxide and magnesium hydroxide; inorganic fillers such as graphite, glass fiber, carbon fiber, and asbestos fiber; and organic fillers such as wood flour, rice hulls, cotton, paper chip, nylon fiber, polyethylene fiber, wood, pulp, and cellulose.

In the case where a light-weight molding, which requires operability, is desired, polyethylene fiber is preferably used as the filler. The molding compound containing polyethylene fiber as the filler is superior to other FRPs in terms of specific strength and specific elastic modulus considering its lightweight.

The filler is added to the molding compound preferably in an amount of about 5 to about 600 parts by weight based on 100 parts by weight of the thermosetting composition, more preferably in an amount of about 20 to about 500, and most preferably in an amount of about 40 to about 450. The molding compound is provided with improved mechanical strength by the addition of the filler in these ranges. Furthermore, the addition of the filler allows the above-mentioned aliphatic polyester to be sufficiently dispersed in the cured composition, so that the decomposing solution more readily permeates the composition, resulting in more sufficient decomposition of the molding compound.

Examples of the thickener include beryllium oxide, magnesium oxide, magnesium hydroxide, calcium oxide, calcium hydroxide, zinc oxide, benzoic acid, phthalic anhydride, tetrahydrophthalic anhydride, and maleic anhydride.

Examples of the mold release agent include stearic acid, zinc stearate, and calcium stearate.

Examples of the wax include Hoechst wax, carnauba wax, and paraffin.

Examples of the colorant include titanium white, chromium oxide, and carbon black.

The above-mentioned molding compound can assume a bulk molding compound (BMC), a sheet molding compound (SMC), and a pellet type molding compound (PMC). The molding compound can be obtained by injection molding, transfer molding, compression molding, and the like.

Known conditions are used for molding. For example, injection molding is preferably conducted under the conditions of a mold temperature of 150° C., an injection pressure of 150 kg/cm$^2$, and a curing time of 5 minutes.

Final molded products obtained from such molding compounds can be used in various fields: e.g., construction materials such as a bathtub, a toilet, a reservoir, and a washstand; household stuff such as a chair, a desk, and furniture; construction materials such as tile, artificial marble, and pipe; bodies or components of transportation equipment such as a marine vessel, an automobile, a railroad, and an aircraft; housing equipment; a decorative laminated sheet; and decorations.

The molded structure of the present invention has a molded portion made of a molding compound of the present invention, integrally molded containing at least metals. Hereinafter, a preferred embodiment of a molded motor will be described as an example of the molded structure of the present invention with reference to the drawings.

Referring to FIG. 1, the first preferred embodiment of the molded motor which is an example of the molded structure of the present invention will be described. FIG. 1 is a cross-sectional view showing an embodiment of a molded motor which is an example of the molded structure of the present invention. The molded motor includes a motor portion 101 and a molded stator 1. The molded stator 1 includes an iron core 4, an insulator 7 covering at least a part of the iron core 4, a coil 3 around the iron core 4 and the insulator 7, and a molded portion 2 made of a molding compound integrally molded with the iron core 4, the coil 3, and the insulator 7. The outermost portion of the molded portion 2 defines the outermost portion of the molded stator 1. The motor portion 101 is provided at an opening of the molded portion 2, having at least a rotary shaft 102 and a rotator 103 attached to the rotary shaft 102, and is supported by a bracket 104. The rotator 103 is supported by a bearing 105 attached to an upper wall of the opening and a bearing 106 attached to the bracket 104. End portions (not shown) of the coil 3 extend into an upper portion of the rotary shaft 102 so as to be connected with leads. Thus, a signal can be input through the leads. The molded stator 1 may be further provided with flanges 5 having a plurality of attachment holes 6.

The molding compound forming the molded portion 2 contains the above-mentioned thermosetting composition at least as a binder.

According to the present invention, the thickness of the thickest portion of the molded portion 2 is preferably in the range of about 0.1 to about 20 mm, more preferably in the range of about 0.2 to about 10 mm, and most preferably in the range of about 0.2 to about 5 mm. It is noted that the thickness may be varied depending upon usage.

As the insulator 7, for example, thermoplastic resins such as an aliphatic polyester, polyethylene terephthalate, and polyethylene can be used. The insulator 7 is required to have the ability to retain the shape of the coil 3 during molding. Therefore, it is preferred that the softening point or the melting point of the insulator 7 is, for example, about 100° C. or more corresponding to a molding temperature so that the insulator 7 is not softened during molding. An aliphatic polyester is particularly preferable for the insulator 7, since it enables the coil 3 to be separated from the iron core 4 while the molded stator 1 is decomposed. An example of an aliphatic polyester having a melting point exceeding 100° C. includes a copolymer resin represented by Formula VII:

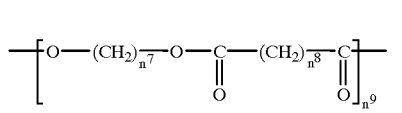

(VII)

Figure 2:
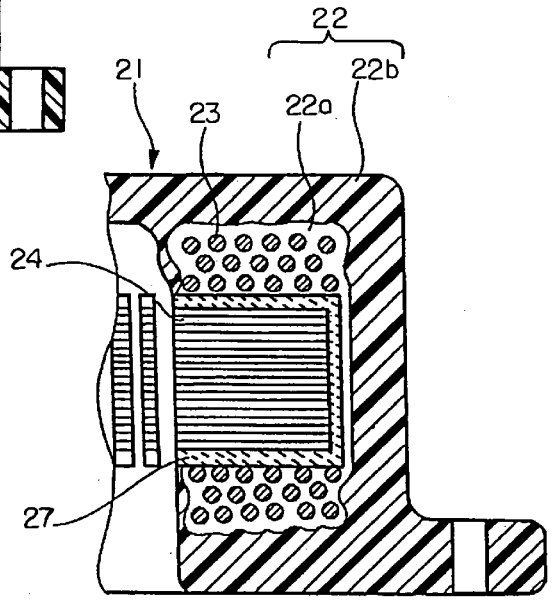
FIG. 2 is an enlarged partial cross-sectional view showing another embodiment of a molded motor which is an example of a molded structure of the present invention.

Referring to FIG. 2, the second preferred embodiment of the molded motor which is an example of the molded structure of the present invention will be described. FIG. 2 is an enlarged partial cross-sectional view of a molded motor in the present embodiment. Hereinafter, the one place of the respective reference numerals in the drawings is identical with that of FIG. 2 and the ten place thereof is identical with the number of the corresponding figure.

In the present embodiment, a molded portion 22 has an inner molded portion 22a and an outer molded portion 22b. As shown in FIG. 2, the molded stator 21 includes an iron core 24, an insulator 27 covering at least a part of the iron core 24, a coil 23 around the iron core 24 and the insulator 27, and a molding compound forming a molded portion 22, integrally molded with the iron core 24, the coil 23, and the insulator 27. The inner molded portion 22a covers at least a part of the iron core 24 and the outer molded portion 22b covers the inner molded portion 22a, and the outermost portion of the outer molded portion 22b defines the outermost portion of the molded stator 21.

The inner molded portion 22a contains an aliphatic polyester as its main component. Here, the main component is intended to have the largest content in the molding compound, which is about 30% by weight or more based on the total weight of the molding compound. For example, the inner molded portion 22a is made of only the above-mentioned aliphatic polyester or the molding compound of the present invention high in aliphatic polyester content, and the outer molded portion 22b is made of the molding compound of the present invention low in aliphatic polyester content or the conventional molding compound containing no aliphatic polyester.

The thickness of the thickest portion of the outer molded portion 22b is preferably in the range of about 0.1 to about 20 mm, more preferably in the range of about 0.2 to about 10 mm, and most preferably in the range of about 0.2 to about 5 mm. It is noted that the thickness may be varied depending upon usage.

The thickness of the thickest portion of the inner molded portion 22a is preferably in the range of about 0.5 to about 10 mm, more preferably in the range of about 1 to about 7 mm, and most preferably in the range of about 2 to about 5 mm. It is noted that the thickness may also be varied depending upon usage.

The molded stator of the present embodiment having the above-mentioned structure has environmental stability superior to that of the molded stator 1 as shown in FIG. 1. For example, in the case where the molded stator of the present embodiment has the outer molded portion 22b made of the molding compound low in aliphatic polyester content or the conventional molding compound containing no aliphatic polyester, the molded stator 21 can be used even in hot and humid surroundings which are likely to decompose aliphatic polyesters.

Furthermore, for example, in the case where the outer molded portion 22b is made of the molding compound low in aliphatic polyester content, the inner molded portion 22a can be made of only aliphatic polyester. In this case, the inner molded portion 22a does not remain at a time when the molded stator 21 is decomposed, and thus, the iron core and the coil can be readily kept for recycling. More specifically, aliphatic polyesters are highly dissolved in the decomposing solution used in the present invention and are not cross-linked, so that when the outer molded portion 22b is ready to be separated from the inner molded portion 22a, the inner molded portion 22a is almost dissolved in the decomposing solution. Accordingly, at a time of the completion of decomposing of the molded stator 21, the iron core and the coil has substantially been washed.

Figure 3:
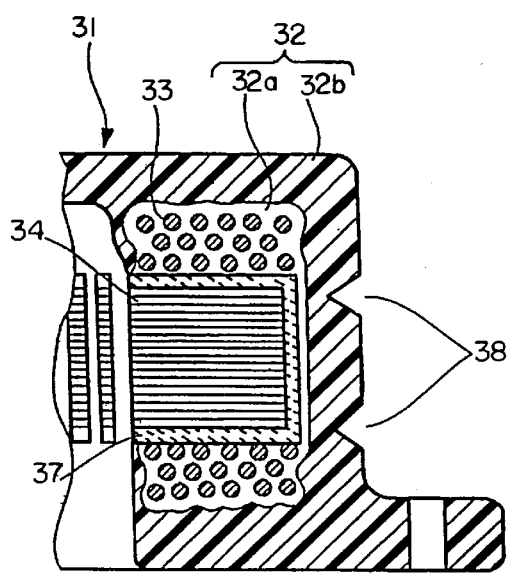
FIG. 3 is an enlarged partial cross-sectional view showing another embodiment of the molded motor shown in FIG. 2.

Referring to FIG. 3, another embodiment of the molded stator 21 of a molded motor shown in FIG. 2 will be described. FIG. 3 is an enlarged partial cross-sectional view of a molded motor.

In the present embodiment, a molded portion 32 has an inner molded portion 32a and an outer molded portion 32b, and a side face of the outer molded portion—32b is provided with notches 38. As shown in FIG. 3, the molded stator 31 includes an iron core 34, an insulator 37 covering at least a part of the iron core 34, a coil 33 around the iron core 34 and the insulator 37, and a molding compound forming a molded portion 32, integrally molded with the iron core 34, the coil 33, and the insulator 37. The inner molded portion 32a covers at least a part of the iron core 34 and the outer molded portion 32b covers the inner molded portion 32a, and the outermost portion of the outer molded portion 32b defines the outermost portion of the molded stator 31. The side face of the outer molded portion 32b is provided with the notches 38.

It is preferred that the inner molded portion 32a is made of a molding compound which is more readily decomposed than that of the outer molded portion 32b.

The notches 38 can be formed by scratching the side face of the outer molded portion 32b with a saw, a chisel, etc. or by cutting the outer surface with a drill.

The notches 38 can be formed on a top face or a bottom face of the outer molded portion 32b.

The molded stator 31 having the above-mentioned structure can be more readily decomposed in the decomposing solution, since the notches 38 increase the entire surface area of the molding compound, which come into contact with the decomposing solution, to increase and cause the inner molded portion 32a to be readily exposed.

Figure 4:
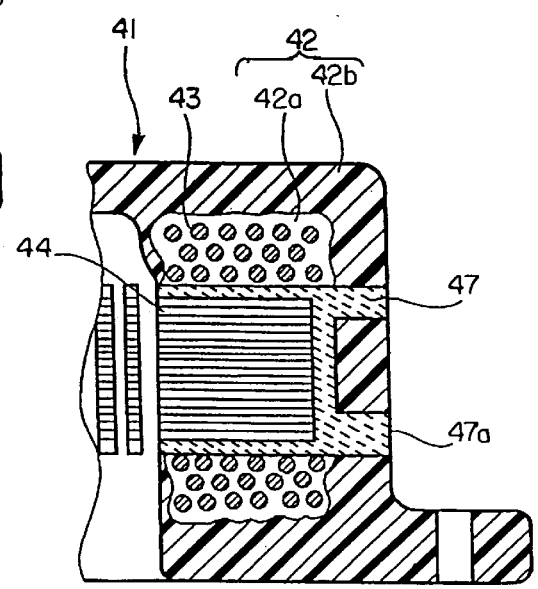
FIG. 4 is an enlarged partial cross-sectional view showing another embodiment of a molded motor which is an example of a molded structure of the present invention.

Referring to FIG. 4, the third preferred embodiment of the molded motor which is an example of the molded structure of the present invention will be described. FIG. 4 is an enlarged partial cross-sectional view of a molded motor of the present embodiment.

In the present embodiment, parts of an insulator 47 are exposed to an outer surface of an outer molded portion 42b.

As shown in FIG. 4, the molded stator 41 includes an iron core 44, an insulator 47 covering at least a part of the iron core 44, a coil 43 around the iron core 44 and the insulator 47, and a molding compound forming a molded portion 42, integrally molded with the iron core 44, the coil 43, and the insulator 47. The inner molded portion 42a covers at least a part of the iron core 44 and the outer molded portion 42b covers the inner molded portion 42a, and the outermost portion of the outer molded portion 42b defines the outermost portion of the molded stator 41. The parts of the insulator 47 penetrate the outer molded portion 42b to be exposed to the outer surface of the outer molded portion 42b.

In the present embodiment, the insulator 47 is preferably made of an aliphatic polyester.

As described above, the molded stator 41 having the above-mentioned structure has an exposed portion 47a of the insulator 47. Therefore, the decomposing solution directly comes into contact with the exposed portion 47a so as to readily decompose the exposed portion 47a, the inside of the insulator 47, and the molded portion 42 in a successive manner. This remarkably facilitates the separation of the coil 43 and the iron core 44 from the inner molded portion 42a.

In the present embodiment, the molded portion 42 has a structure with an inner molded portion and an outer molded portion as shown in FIG. 4; alternatively, the molded portion 42 can have a single structure as shown in FIG. 1.

Figure 5:
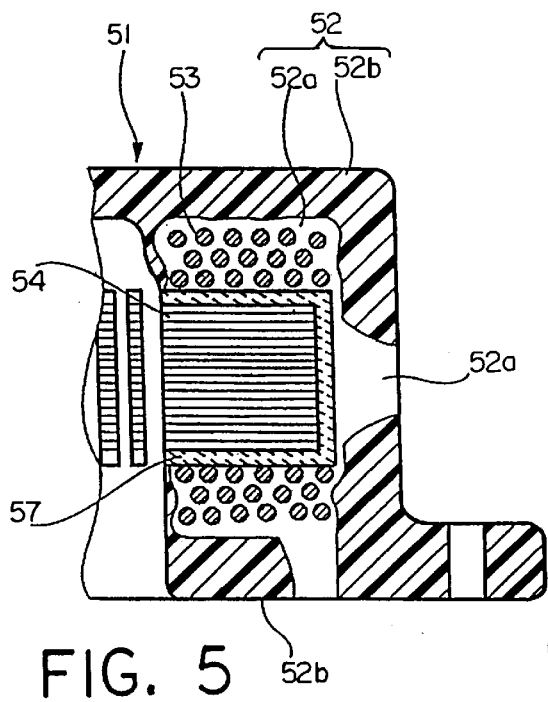
FIG. 5 is a partial cross-sectional view showing another embodiment of the molded motor shown in FIG. 4.

Referring to FIG. 5, another embodiment of the molded stator 41 of a molded motor of FIG. 4 will be described. FIG. 5 is an enlarged partial cross-sectional view of a molded stator 51 of the present embodiment.

In the present embodiment, a part of an inner molded portion 52a is exposed to an outer surface of an outer molded portion 52b. As shown in FIG. 5, the molded stator 51 includes an iron core 54, an insulator 57 covering at least a part of the iron core 54, a coil 53 around the iron core 54 and the insulator 57, and a molding compound forming a molded portion 52, integrally molded with the iron core 54, the coil 53, and the insulator 57. The inner molded portion 52a covers at least a part of the iron core 54 and the outer molded portion 52b covers at least a part of the inner molded portion 52a, and the outermost portion of the outer molded portion 52b defines the outermost portion of the molded stator 51. Part of the inner molded portion 52a penetrates the outer molded portion 52b to be exposed to the outer surface of the outer molded portion 52b.

It is preferred that the inner molded portion 52a is made of a molding compound which is more readily decomposed than that of the outer molded portion 52b. More specifically, the content of the aliphatic polyester of the molding compound forming the inner molded portion 52a is larger than that of the molding compound forming the outer molded portion 52b. For example, the inner molded portion 52a is made of only the above-mentioned aliphatic polyester or the molding compound of the present invention high in aliphatic polyester content, and the outer molded portion 52b is made of the molding compound of the present invention low in aliphatic polyester content or the conventional molding compound containing no aliphatic polyester.

As described above, in the same way as the case shown in FIG. 4, the inner molded portion 52a capable of being readily decomposed is partially exposed to the outer surface of the outer molded portion 52a. Therefore, the decomposing solution directly comes into contact with the inner molded portion 52a so as to decompose the exposed portion of the inner molded portion 52a and the inside thereof in a successive manner. This remarkably facilitates the separation of the coil 53 and the iron core 54 from the inner molded portion 52a.

Figure 6:
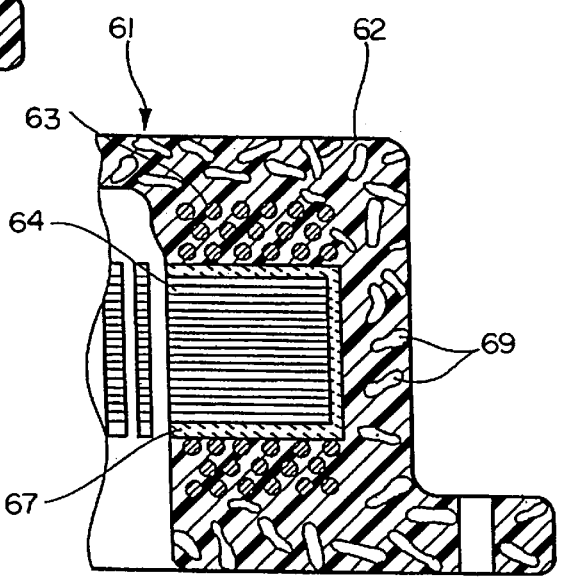
FIG. 6 is an enlarged partial cross-sectional view showing another embodiment of a molded motor which is an example of a molded structure of the present invention.
Figure 7:
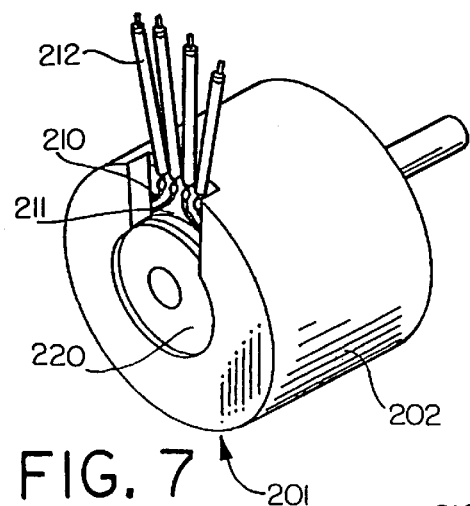
FIG. 7 is a perspective view showing an external appearance of a conventional molded motor.
Figure 8:
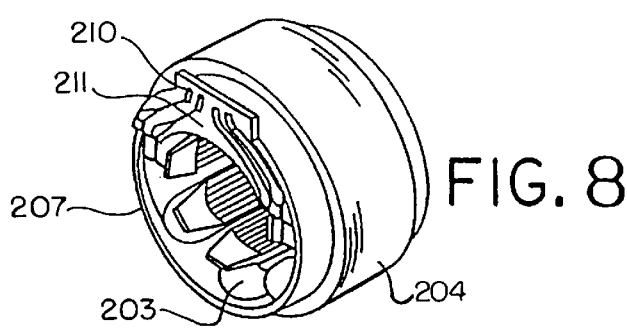
FIG. 8 is a perspective view showing an external appearance of a stator portion of the conventional molded motor.

Referring to FIG. 6, the fourth preferred embodiment of the molded motor which is an example of the molded structure of the present invention will be described. FIG. 6 is an enlarged partial cross-sectional view of a molded motor of the present embodiment.

In the present embodiment, a molding compound forming a molded portion 62 contains an aliphatic polyester as a filler 69. As shown in FIG. 6, the molded stator 61 includes an iron core 64, an insulator 67 covering at least a part of the iron core 64, a coil 63 around the iron core 64 and the insulator 67 and a molding compound forming a molded portion 62, integrally molded with the iron core 64, the coil 63, and the insulator 67. The outermost portion of the molded portion 62 defines the outermost portion of the molded stator 61. The filler 69 is dispersed in the molded portion 62.

It is preferred that the aliphatic polyester used as the filler 69 has low solubility with respect to each component of the molding compound. The filler 69 may be either in needle form, fiber form, or particle form.

In the molded stator 61 having the above-mentioned structure, the filler portion made of an aliphatic polyester in the molded portion 62 is preferentially decomposed while the molded stator 61 is decomposed in the decomposing solution; as a result, a number of voids are formed in the molded portion 62. This causes the mechanical strength of the molded portion 62 to sufficiently decrease and facilitates the occurrence of cracks from the voids in the molded portion 62. Thus, the coil 63 and the iron core 64 are remarkably readily separated from the molded portion 62 by impact or the like.

The molded motor which is an example of the molded structure of the present invention can be applied to a brushless DC motor, an AC motor, a linear motor, and the like.

The molded motor which is an example of the molded structure of the present invention can be readily decomposed by appropriately combining the structures of the above-mentioned preferred embodiments.

The same effect can be obtained from the molded structures other than the molded motor by appropriately combining the structures of the preferred embodiments of the above-mentioned molded motors.

A method for decomposing a thermosetting composition, a molding compound, and a molded structure for disposal according to the present invention includes the step of soaking them in a decomposing solution containing a base and at least one solvent selected from the group consisting of water, methanol, ethanol, and ethylene glycol.

A soaking time can vary depending upon a temperature of the soaking solution. For example, when the thermosetting composition, the molding compound, or the molded structure are soaked in a decomposing solution at 60° C., the time required for decomposing it can be shortened to about ⅙ of the case where either one of them is soaked in a decomposing solution at room temperature. It is noted that the temperature of the decomposing solution is desirably less than a boiling point of the above-mentioned solvent in order to prevent the solvent from evaporating.

Another method for decomposing a molded structure for disposal according to the present invention includes the steps of: exposing at least part of an inner molded portion by cutting or opening; and soaking the molded structure in a good solvent with respect to an aliphatic polyester or in a decomposing solution containing a base and at least one solvent selected from the group consisting of water, methanol, ethanol, and ethylene glycol.

The above-mentioned exposed portion of the inner molded portion can be formed by scratching the outer surface of the outer molded portion with a saw, a chisel, etc. or by cutting the outer surface with a drill.

Examples of the good solvent for the aliphatic polyester used in the above-mentioned method include aromatic hydrocarbons such as toluene and xylene; ketones such as methyl ethyl ketone and acetone; esters such as ethyl acetate and butyl acetate; and trichlene.

In the case where the good solvent is used, the soaking time can vary depending upon temperature and kinds of solvents. For example, in the case where the molded stator is soaked in toluene at room temperature, the aliphatic polyester contained therein can be almost decomposed in 24 hours.

Aliphatic polyesters are generally biodegradable. Thus, in the case where the inner molded portion made of an aliphatic polyester is exposed, the inner molded portion can be decomposed by being soaked in an aqueous solution containing lipase, which decomposes aliphatic polyesters, soil, or sea water. It should be noted that it takes a very long period of time to decompose the inner molded portion in these solutions.

The first thermosetting composition of the present invention contains a thermosetting resin and an aliphatic polyester, as described above. After the thermosetting composition is cured, the aliphatic polyester is dispersed in a three-dimensional network structure of the cured composition. Ester bonds of the aliphatic polyester are much more readily decomposed by a base, compared with condensation bonds of the thermosetting resin. That is, the presence of the aliphatic polyester facilitates the decomposing solution to permeate into the entire three-dimensional network structure of the cured composition and the permeated decomposing solution decomposes the aliphatic polyester, whereby permeation of the decomposing solution is further promoted. As a result, chances of reaction between the condensation bonds of the thermosetting resin and the decomposing solution increase, whereby decomposition of the thermosetting composition is promoted.

The second thermosetting composition of the present invention contains an unsaturated polyester, an addition polymerizable monomer, a low shrink agent other than an aliphatic polyester, and an aliphatic polyester. After the thermosetting composition is cured, the aliphatic polyester is dispersed in the three-network structure of the cured composition. Thus, the cured thermosetting composition of the present invention has solubility such as being readily decomposed in a decomposing solution containing a base and at least one solvent selected from the group consisting of water, methanol, ethanol, and ethylene glycol. The reasons are as follows.

The above-mentioned aliphatic polyester has outstanding solubility with respect to the above-mentioned decomposing solution. Thus, attractive interaction is caused between the decomposing solution and the aliphatic polyester in the three-dimensional network structure. As described above, since the aliphatic polyester is dispersed in the three-dimensional network structure, the decomposing solution readily permeates into the entire three-dimensional network structure of the cured composition. The decomposing solution thus permeated decomposes ester bonds in the aliphatic polyester and the unsaturated polyester by the function of the base. Thus, the three-dimensional network structure of the cured composition can be rapidly decomposed at a temperature equal to or lower than a boiling point of the decomposing solution to a degree that a form of the cured composition cannot be maintained.

Furthermore, the cured thermosetting compositions of the present invention have the same moldability and mechanical strength as those of conventional thermosetting compositions.

In the above-mentioned thermosetting composition, in the case where the addition polymerizable monomer is an aliphatic polyester having an addition polymerizable terminal, the aliphatic polyester portion of the addition polymerizable monomer forms a part of the three-dimensional network structure of the cured composition and the above-mentioned aliphatic polyester is uniformly dispersed in the three-dimensional network structure. Thus, the combined effects of the aliphatic polyester moiety of the addition polymerizable monomer and the aliphatic polyester of the composition accelerates the decomposition of the above-mentioned mechanism. Therefore, decomposition of the cured composition is more readily effected. Furthermore, since the addition polymerizable monomer and the aliphatic polyester have outstanding compatibility therebetween, the resulting thermosetting composition has outstanding stability in a liquid state.

Furthermore, by allowing at least one auxiliary solvent selected from the group consisting of acetone, 2-butanone, dimethylformamide, dimethyl sulfoxide, dioxane, tetrahydrofuran, diethyl ether, diethylene glycol, diethylene glycol monoester, diethylene glycol diester, dicarboxylic acid diester, methyl acetate, ethyl acetate, benzene, toluene, and phenol to be contained in the decomposing solution, the permeability of the decomposing solution with respect to the cured composition and the solubility of the decomposition product of the cured composition with respect to the decomposing solution increase. As a result, decomposition of the cured substance is more promoted.

The third thermosetting composition of the present invention contains an unsaturated polyester, an addition polymerizable monomer, polycaprolatone, and preferably an aliphatic polyester. In the thermosetting composition, polycaprolactone also functions as a low shrink agent. Furthermore, since polycaprolactone is an aliphatic polyester, it has outstanding compatibility with aliphatic polyesters other than polycaprolactone. Thus, the use of polycaprolactone as a component of the thermosetting composition facilitates the preparation of the composition. In addition, the resulting thermosetting composition has outstanding stability in a liquid state.

This thermosetting composition has more outstanding solubility in a decomposing solution since polycaprolactone contained therein is a kind of aliphatic polyester. Furthermore, polycaprolactone allows the thermosetting composition to retain outstanding moldability and superior mechanical strength after being cured.

The fourth thermosetting composition of the present invention contains an aliphatic polyester, and a phenol resin or an epoxy resin. In this thermosetting composition, because of the effect of the aliphatic polyester, the three-dimensional network structure of the phenol resin or the epoxy resin after the composition is cured is readily decomposed by the same mechanism as the above.

The molding compound of the present invention contains the above-mentioned thermosetting composition as a binder. The aliphatic polyester contained in the binder functions so as to facilitate the decomposition of the three-dimensional network structure of the composition in the same mechanism as that described above. Thus, the molding compound of the present invention can be readily decomposed in a decomposing solution containing a base and at least one solvent selected from the group consisting of water, methanol, ethanol, and ethylene glycol.

The molded structure of the present invention has a molded portion made of the above-mentioned molding compound, so that the aliphatic polyester contained in the binder of the molding compound functions so as to facilitate the decomposition of the three-dimensional network structure of the binder in the same mechanism as that described above. Thus, the molded structure of the present invention is readily decomposed in a decomposing solution containing a base and at least one solvent selected from the group consisting of water, methanol, ethanol, and ethylene glycol. As a result, metals are readily separated from the molded portion. This is remarkably effective in terms of recycling of expensive substances.

Furthermore, in the case where the molded structure of the present invention has a molded portion including an outer molded portion and an inner molded portion and the inner molded portion is made of a molding compound which is more readily decomposed than that of the outer molded portion, the inner molded portion is decomposed in a short period of time. Therefore, the inside of the molded structure assumes a hollow state. This facilitates the separation of metals from the molded structure.

As described above, the thermosetting composition of the present invention, the molding compound containing the composition, and the molded structure using the molding compound have outstanding solubility with respect to a decomposing solution containing a base and at least one solvent selected from the group consisting of water, methanol, ethanol, and ethylene glycol. Therefore, they are readily (i.e., rapidly at a temperature equal to or lower than a boiling point of the decomposing solution) decomposed in the decomposing solution. Furthermore, the aliphatic polyesters do not hinder the formation of the three-dimensional network structure of the cured composition; therefore, the resulting composition has the same outstanding moldability and mechanical strength as those of the conventional compositions.

EXAMPLE 1

First, 56 parts by weight of a copolymer (EPOLAC, produced by Nippon Shokubai Kagaku Kogyo Co., Ltd.) of maleic acid/phthalic acid/propylene glycol in a molar ratio of 1/1/2 containing 30% by weight of styrene, as an unsaturated polyester; 38 parts by weight of styrene as an addition polymerizable monomer; 5 parts by weight of polystyrene as a low shrink agent; and 6 parts by weight of polycaprolactone having a molecular weight of 40,000 (PLACCEL, produced by Daicel Chemical Industries, Ltd.) were mixed. Then, t-butylperoxybenzoate (PERBUTYL Z, produced by Nippon Oil and Fats Co., Ltd.) as a curing agent was added to the mixture in an amount of one part by weight based on 100 parts by weight of the mixture to obtain a thermosetting composition. The composition thus obtained was poured into a box-shaped mold with a thickness of 1 mm and heated at 120° C. for 30 minutes, thereby allowing the composition to be cured. The cured composition was cut into a rectangular test sample for decomposition with a size of 10 mm×20 mm×1 mm.

Next, 1 g of sodium hydroxide and 30 g of ethanol were mixed to prepare a decomposing solution. The above-mentioned test sample was soaked in this solution at room temperature, and weight decrease with time was observed. The results are shown in Table 1.
Comparative Example 1

A test sample was prepared and a decomposition test was conducted by using the test sample in the same way as in Example 1, except that polycaprolactone was not contained in the thermosetting composition. The results are shown in Table 1.

TABLE 1

|  | Weight decrease (%) of test sample | | | |
| --- | --- | --- | --- | --- |
|  | 50 hours | 100 hours | 200 hours | 500 hours |
| Example 1 | 17 | 20 | 23 | 24 |
| Comparative Example 1 | 0 | 0 | 1 | 1 |

As is apparent from Table 1, the weight of the test sample made from the thermosetting composition of Example 1, containing polycaprolactone, was decreased by 17% after a lapse of 50 hours after the test sample was soaked in the solution, whereas the weight of the test sample made from the thermosetting composition of Comparative Example 1, containing no polycaprolactone, was decreased by only 1% even after a lapse of 500 hours after the test sample was soaked in the solution. The decreased amount of the test sample of Example 1 far exceeded the content of polycaprolactone, i.e., about 5.7% by weight, revealing that components of the composition other than polycaprolactone were also decomposed in a great amount. The NMR measurement of the resulting solution confirmed the presence of phthalic acid contained in the unsaturated polyester. It is understood from this fact that 50% or more of ester bonds of the unsaturated polyester as well as those of polycaprolactone were cleaved. Accordingly, the decomposition of the test sample, i.e., the cured thermosetting composition, was markedly increased because the composition contained polycaprolactone which was one kind of aliphatic polyesters.

The test sample of Example 1 was visually observed after a lapse of 50 hours after the test sample was soaked in the solution. This revealed that the test sample was decomposed to many pieces without retaining the form of the original test sample.

In addition, the thermosetting composition of Example 1 had no problems in terms of curing properties (i.e., a gelation time and a curing time), and injection molding and transfer molding properties (i.e., a spiral flow length). Furthermore, the cured composition had no problems in terms of external appearance and mechanical strength.

As described above, the cured thermosetting composition of the present invention can be readily decomposed in the decomposing solution containing a base and ethanol at room temperature while retaining outstanding properties of the conventional thermosetting compositions.

EXAMPLE 2

First, 56 parts by weight of an unsaturated polyester (EPOLAC, produced by Nippon Shokubai Kagaku Kogyo Co., Ltd.); 38 parts by weight of styrene as an addition polymerizable monomer; 6 parts by weight of polystyrene as a low shrink agent; and 6 parts by weight of polycaprolactonediol having a molecular weight of 2,000 (PLACCEL 200, produced by Daicel Chemical Industries, Ltd.) as an aliphatic polyester were mixed. Then, t-butylperoxybenzoate (PERBUTYL Z, produced by Nippon Oil and Fats Co., Ltd.) as a curing agent was added to the mixture in an amount of one part by weight based on 100 parts by weight of the mixture to obtain a thermosetting composition. The composition thus obtained was poured into a box-shaped mold with a thickness of 1 mm and heated at 120° C. for 30 minutes, thereby allowing the composition to be cured. The cured composition was cut into a rectangular test sample for decomposition with a size of 10 mm×20 mm×1 mm.

Next, 1 g of sodium hydroxide as a base, 15 g of methanol, and 15 g of water were mixed to prepare a decomposing solution. The above-mentioned test sample was soaked in this solution at room temperature, and weight decrease with time was observed. The results are shown in Table 2.

EXAMPLE 3

A test sample was prepared and a decomposing test was conducted by using the test sample in the same way as in Example 2, except that 6 parts by weight of polylactic acid were used in place of polycaprolactonediol. The results are shown in Table 2.

EXAMPLE 4

A test sample was prepared and a decomposing test was conducted by using the test sample in the same way as in Example 2, except that 6 parts by weight of polycaprolactonetriol having a molecular weight of 3,000 (PLACCEL 300, produced by Daicel Chemical Industries, Ltd.) was used in place of polycaprolactonediol. The results are shown in Table 2.

EXAMPLE 5

A test sample was prepared and a decomposing test was conducted by using the test sample in the same way as in Example 2, except that a decomposing solution containing no methanol (i.e., a solution obtained by mixing 1 g of sodium hydroxide and 30 g of water) was used and the temperature of the decomposing solution was 80° C. The results are shown in Table 2.

EXAMPLE 6

A test sample was prepared in the same way as in Example 2, except that a decomposing solution containing ethylene glycol in place of water (i.e., a solution obtained by mixing 1 g of sodium hydroxide, 15 g of methanol, and 15 g of ethylene glycol) was used. The result is shown in Table 2.

TABLE 2

| | Weight decrease (%) of test sample | | | |
|---|---|---|---|---|
| | 25 hours | 50 hours | 100 hours | 200 hours |
| Example 2 | 21 | 32 | 34 | 35 |
| Example 3 | 17 | 24 | 26 | 27 |
| Example 4 | 7 | 13 | 17 | 17 |
| Example 5 | 19 | 30 | 33 | 34 |
| Example 6 | 14 | 19 | 24 | 28 |

Notes: In Examples 2 to 4, the decomposing solutions at room temperature containing methanol and water were used; in Example 5, the decomposing solution at 80° C. not containing methanol was used; in Example 6, the decomposing solution at room temperature containing methanol and ethylene glycol was used.

As is apparent from Table 2, in Examples 2 to 6, the test samples treated with the decomposing solutions containing a base and water, methanol, or ethylene glycol decreased in weight by at least 17% after a lapse of 200 hours after the test samples were soaked in the solutions, showing outstanding solubility. Comparing Example 2 with Example 5, the decomposing solution containing sodium hydroxide and water had the same decomposing property as that of the decomposing solution containing sodium hydroxide, methanol, and water by being heated up to 80° C. Comparing Example 2 with Example 6, the decomposing solution using methanol and water as a solvent had outstanding decomposing ability than that of the decomposing solution using methanol and ethylene glycol as a solvent.

Furthermore, the test samples of Examples 2 to 6 were visually observed after a lapse of 200 hours after the test samples were soaked in the solution. This revealed that the test samples were in a soft rubbery state, which were capable of being readily processed, e.g., crushed or deformed.

As described above, the cured thermosetting composition of Examples 2 to 6 can be readily decomposed in the decomposing solution containing a base, water, methanol, and ethylene glycol at room temperature or at a temperature equal to or lower than a boiling point of the decomposing solution while retaining outstanding properties of the conventional thermosetting compositions.

EXAMPLE 7

First, 56 parts by weight of an unsaturated polyester (EPOLAC, produced by Nippon Shokubai Kagaku Kogyo Co., Ltd.); 38 parts by weight of styrene as an addition polymerizable monomer; 6 parts by weight of polystyrene as a low shrink agent; and 6 parts by weight of polycaprolactone having a molecular weight of 40,000 (PLACCEL, produced by Daicel Chemical Industries, Ltd.) were mixed. Then, t-butylperoxylaurate (PERBUTYL Z, produced by Nippon Oil and Fats Co., Ltd.) as a curing agent was added to the mixture in an amount of one part by weight based on 100 parts by weight of the mixture to obtain a thermosetting composition. The composition thus obtained was poured into a box-shaped mold with a thickness of 1 mm and heated at 120° C. for 30 minutes, thereby allowing the composition to be cured. The cured composition was cut into a rectangular test sample for decomposition with a size of 10 mm×20 mm×1 mm.

Next, 1 g of sodium hydroxide as a base, 27 g of methanol, and 3 g of water were mixed to prepare a decomposing solution. The above-mentioned test sample was soaked in this solution at room temperature, and weight decrease with time was observed. The results are shown in Table 3.

EXAMPLE 8

A test sample was prepared and a decomposing test was conducted by using the test sample in the same way as in Example 7, except that polystyrene as a low shrink agent was not used. The results are shown in Table 3.

EXAMPLE 9

A test sample was prepared and a decomposing test was conducted by using the test sample in the same way as in Example 7, except that polycaprolactonediol having a molecular weight of 2,000 (PLACCEL 200, produced by Daicel Chemical Industries, Ltd.) was used in place of polycaprolactone. The results are shown in Table 3.

EXAMPLE 10

A test sample was prepared and a decomposing test was conducted in the same way as in Example 7, except that 6 parts by weight of polycaprolactonediol having a molecular weight of 2,000 (PLACCEL 200, produced by Daicel Chemical Industries, Ltd.) was further used and polystyrene as a low shrink agent was not used. The results are shown in Table 3.

Comparative Example 2

A test sample was prepared and a decomposing test was conducted in the same way as in Example 7, except that the thermosetting composition did not contain polycaprolactone. The results are shown in Table 3.

TABLE 3

| | Weight decrease (%) of test sample | | | |
| --- | --- | --- | --- | --- |
| | 50 hours | 100 hours | 200 hours | 500 hours |
| Example 7 | 15 | 23 | 24 | 24 |
| Example 8 | 18 | 27 | 32 | 33 |
| Example 9 | 17 | 27 | 30 | 31 |
| Example 10 | 20 | 32 | 37 | 38 |
| Comparative Example 2 | 0 | 0 | 1 | 1 |

As is apparent from Table 3, the weight of the test samples made from the thermosetting compositions of Examples 7 to 10 was decreased by at least 24% after a lapse of 500 hours after the test samples were soaked in the solutions, whereas the weight of the test sample made from the thermosetting composition of Comparative Example 2 was decreased by only 1% even after a lapse of 500 after the test sample was soaked in the solution.

The weight of the test samples made from the thermosetting compositions of Examples 8 and 10 containing no low shrink agent was decreased in a slightly larger proportion than that of Examples 7 and 9. The reason for this is considered as follows: As containing polystyrene as the low shrink agents which are not hydrophilic, the cured thermosetting compositions of Examples 7 and 9 do not allow the decomposing solutions to permeate thereto so readily as the cured thermosetting compositions of Examples 8 and 10.

The shrinkage of the compositions upon being cured was 0.1% or less in Examples 7 to 10, and Comparative Example 2. Thus, in the samples obtained from the thermosetting composition of Example 10 not containing a low shrink agent, shrinkage slightly decreased. The thermosetting composition containing polycaprolactone exhibited the same shrinkage as that of the composition of Comparative Example 2 containing the low shrink agent. It is understood from this fact that polycaprolactone is an aliphatic polyester capable of working as a shrink agent.

The test samples of Examples 7 to 10 were visually observed after a lapse of 500 hours after the test samples were soaked in the solution. This revealed that the test samples were in a soft rubbery state, which were capable of being readily processed, e.g., crushed or deformed.

In addition, the thermosetting compositions of Examples 7 to 10 had no problems in terms of curing properties (i.e., a gelation time and a curing time), and injection molding and transfer molding properties (i.e., a spiral flow length). Furthermore, the cured compositions had no problems in terms of external appearance and mechanical strength.

As described above, the cured thermosetting compositions of the present invention can be readily decomposed in the decomposing solutions containing a base, methanol, and water at room temperature while retaining outstanding properties of the conventional thermosetting compositions.

EXAMPLE 11

First, 35 parts by weight of unsaturated polyester (EPOLAC, produced by Nippon Shokubai Kagaku Kogyo Co., Ltd.), 15 parts by weight of styrene, and 50 parts by weight of a hydroxyethyl acrylate monomer (produced by Daicel Chemical Industries, Ltd.) having a polycaprolactone portion at a side chain were mixed. Then, 5 parts by weight of polymethylmethacrylate as a low shrink agent, 6 parts by weight of polycaprolactone as an aliphatic polyester, and 1 part by weight of t-butylperoxybenzoate (PERBUTYL Z, produced by Nippon Oil and Fats Co., Ltd.) as a curing agent were added to 100 parts by weight of the mixture to obtain a thermosetting composition. The composition was poured into a box-shaped mold with a thickness of 1 mm and heated at 120° C. for 30 minutes, thereby allowing the composition to be cured. The cured composition was cut into a rectangular test sample for decomposition with a size of 10 mm×20 mm×1 mm.

Next, 1 g of sodium hydroxide and 30 g of methanol were mixed to prepare a decomposing solution. The above-mentioned test sample was soaked in this solution at room temperature, and weight decrease with time was observed. The results are shown in Table 4.

EXAMPLE 12

A test sample was prepared and a decomposing test was conducted in the same way as in Example 11, except that a decomposing solution prepared by mixing 1 g of sodium hydroxide, 27 g of ethanol, and 3 g of water was used. The results are shown in Table 4.

Comparative Example 3

A test sample was prepared and a decomposing test was conducted by using the test sample in the same way as in Example 11, except that a decomposing solution containing no base (i.e., a solution obtained by mixing 27 g of ethanol and 3 g of water) was used. The results are shown in Table 4.

EXAMPLE 13

First, 65 parts by weight of unsaturated polyester (EPOLAC, produced by Nippon Shokubai Kagaku Kogyo Co., Ltd.), 35 parts by weight of styrene, and 15 parts by weight of ethyl acrylate were mixed. Then, 5 parts by weight of polymethylmethacrylate as a low shrink agent, 6 parts by weight of polycaprolactone, and 1 part by weight of t-butylperoxybenzoate (PERBUTYL Z, produced by Nippon Oil and Fats Co., Ltd.) as a curing agent were added to 57.5 parts by weight of the mixture to obtain a thermosetting composition. The composition was poured into a box-shaped mold with a thickness of 1 mm and heated at 120° C. for 30 minutes, thereby allowing the composition to be cured. The cured composition was cut into a rectangular test sample for decomposition with a size of 10 mm×20 mm×1 mm.

Next, 1 g of sodium hydroxide and 30 g of methanol were mixed to prepare a decomposing solution. The above-mentioned test sample was soaked in this solution at room temperature, and weight decrease with time was observed. The results are shown in Table 4.

EXAMPLE 14

A test sample was prepared and a decomposing test was conducted by using the test sample in the same way as in Example 13, except that a decomposing solution prepared by mixing 1 g of sodium hydroxide, 27 g of ethanol, and 3 g of water was used. The results are shown in Table 4.

Comparative Example 4

A test sample was prepared and a decomposing test was conducted by using the test sample in the same way as in Example 13, except that a decomposing solution containing no base (i.e., a solution obtained by mixing 27 g of ethanol and 3 g of water) was used. The results are shown in Table 4.

TABLE 4

| | Weight decrease (%) of test sarnple | | | |
|---|---|---|---|---|
| | 50 hours | 100 hours | 200 hours | 500 hours |
| Example 11 | 24 | 31 | 33 | 34 |
| Example 12 | 22 | 30 | 40 | 39 |
| Example 13 | 17 | 19 | 20 | 21 |
| Example 14 | 14 | 21 | 24 | 25 |
| Comparative Example 3 | 0 | 0 | 0 | 0 |
| Comparative Example 4 | 0 | 0 | 0 | 0 |

Notes: In Examples 11 and 13, the decomposing solutions containing methanol and sodium hydroxide were used; in Examples 12 and 14, the decomposing solutions containing ethanol, sodium hydroxide, and water were used; in Comparative Examples 3 and 4, the decomposing solutions containing no sodium hydroxide were used.

As is apparent from Table 4, in Examples 11 to 14 and Comparative Examples 3 and 4, the weight of the test samples of Examples 11 to 14 treated with the decomposing solutions containing sodium hydroxide and ethanol was decreased by at least 21% after a lapse of 500 hours after the test samples were soaked in the solutions, whereas the weight of the test samples of Comparative Examples 3 and 4 treated with the decomposing solution not containing sodium hydroxide was not decreased even after a lapse of 500 hours after the test samples were soaked in the solutions. The comparisons between Examples 11 and 12 and between Examples 13 and 14 revealed that the cured thermosetting compositions were more readily decomposed in the decomposing solutions containing water in an appropriate amount. Also, the comparisons between Examples 11 and 13 and between Examples 12 and 14 revealed that the thermosetting compositions containing an aliphatic polyester having at least an addition polymerizable group at its molecular terminals as an addition polymerizable monomer were more readily decomposed in the decomposing solutions.

The NMR measurement of the resulting solution confirmed the presence of phthalic acid contained in the unsaturated polyester. It is understood from this fact that ester bonds of the unsaturated polyester as well as those of the aliphatic polyester were decomposed.

The test samples of Examples 11 to 14 were visually observed after a lapse of 500 hours after the test samples were soaked in the solution. This revealed that the test samples were in a soft rubbery state, which were capable of being readily processed, e.g., crushed or deformed.

As described above, the cured thermosetting composition of Examples 11 to 14 can be readily decomposed in the decomposing solutions containing a base and water, ethanol, or methanol at room temperature or at a temperature while retaining outstanding properties of the conventional thermosetting compositions.

EXAMPLE 15

As a polymer having an aliphatic polyester portion at a side chain, an epoxy resin having a lactone portion at a side chain (PLACCEL G, produced by Daicel Chemical Industries, Ltd.), obtained by modifying secondary hydroxyl groups of a bisphenol-epichlorohydrin resin into lactone, was used. One part by weight of benzylmethylamine as a curing agent was mixed with 10 parts by weight of the resin to obtain a thermosetting composition. Then, the composition thus obtained was poured into a box-shaped mold with a thickness of 1 mm and heated at 100° C. for 30 minutes, thereby allowing the composition to be cured. The cured composition was cut into a rectangular test sample for decomposition disposal with a size of 10 mm×20 mm×1 mm.

The cured composition had no problem in terms of mechanical strength.

Next, 1 g of sodium hydroxide, 24 g of methanol, and 6 g of water were mixed to prepare a decomposing solution. The above-mentioned test sample was soaked in this solution at room temperature, and weight decrease after a lapse of 150 hours after the test sample was soaked in the solution was measured. The resulting weight decrease was about 22%. At this time, the test sample was visually observed. This revealed that the test sample was decomposed to many pieces without retaining the form of the original test sample.

As described above, the cured thermosetting composition of Example 15 can be readily decomposed in the decomposing solution containing a base and methanol and water at room temperature while retaining outstanding properties of the conventional thermosetting compositions.

EXAMPLE 16

First, 38 parts by weight of a phenol resin (STANDLITE CP, produced by Hitachi Chemical Co., Ltd.; or FUDOWLITE, produced by Fudow Co., Ltd.), 2 parts by weight of polycaprolactone having a molecular weight of 40,000 (PLACCEL, produced by Daicel Chemical Industries, Ltd.), 50 parts by weight of calcium carbonate having a particle size of about 5 $\mu$m, and 10 parts by weight of glass fibers having a diameter of about 0.5 mm and a length of 20 mm were mixed. Then, hexamethylenetetramine as a curing agent was added to the resulting mixture in an amount of 4 parts by weight based on 38 parts by weight of the phenol resin and 2 parts by weight of the polycaprolactone to obtain a thermosetting composition. The composition thus obtained was poured into a box-shaped mold with a thickness of 1 mm and heated at 140° C. for about 30 minutes, thereby allowing the composition to be cured. The cured composition was cut into a rectangular test sample for decomposition with a size of 10 mm×20 mm×1 mm.

Next, 1 g of sodium hydroxide, 24 g of methanol, and 6 g of water were mixed to prepare a decomposing solution. The above-mentioned test sample was soaked in this solution at room temperature, and weight decrease with time was observed. The results are shown in Table 5.

EXAMPLE 17

First, 38 parts by weight of an epoxy resin (STANDLITE CEL, produced by Hitachi Chemical Co., Ltd.; or EPICLONE, produced by Dainippon Ink and Chemicals, Inc.), 2 parts by weight of polycaprolactone having a molecular weight of 40,000 (PLACCEL, produced by Daicel Chemical Industries, Ltd.), 50 parts by weight of calcium carbonate having a particle size of about 5 $\mu$m, and 10 parts by weight of glass fibers having a diameter of about 0.5 mm and a length of 20 mm were mixed. Then, hexamethylenetetramine as a curing agent was added to the resulting mixture in an amount of 4 parts by weight based on 38 parts by weight of the epoxy resin and 2 parts by weight of the polycaprolactone to obtain a thermosetting composition. The composition thus obtained was poured into a box-shaped mold with a thickness of 1 mm and heated at 100° C. for about 30 minutes, thereby allowing the composition to be cured. The cured composition was cut into a rectangular test sample for decomposition with a size of 10 mm×20 mm×1 mm.

Next, 1 g of sodium hydroxide, 24 g of methanol, and 6 g of water were mixed to prepare a decomposing solution. The above-mentioned test sample was soaked in this solution at room temperature, and weight decrease with time was observed. The results are shown in Table 5.

TABLE 5

| | Weight decrease (%) of test sample | | | |
|---|---|---|---|---|
| | 50 hours | 100 hours | 200 hours | 500 hours |
| Example 16 | 2 | 4 | 8 | 9 |
| Example 17 | 3 | 4 | 8 | 8 |

As is apparent from Table 5, the weight of the test samples made from the thermosetting compositions of Examples 16 and 17 was decreased by about 10% after a lapse of 500 hours after the test samples were soaked in the solutions.

The test samples were visually observed. This revealed that the test samples were in a brittle state, which were capable of being processed, e.g., crushed or deformed.

In addition, the thermosetting compositions of Examples 16 and 17 had no problems in terms of curing properties, and injection molding and transfer molding properties. Furthermore, the cured compositions had no problems in terms of external appearance and mechanical strength.

As described above, the cured thermosetting compositions of Examples 16 and 17 can be readily decomposed in the decomposing solutions containing a base and methanol and water at room temperature while retaining outstanding properties of the conventional thermosetting compositions.

EXAMPLE 18

First, 24 parts by weight of an unsaturated polyester (EPOLAC, produced by Nippon Shokubai Kagaku Kogyo Co., Ltd.), 6 parts by weight of a styrene containing 30% by weight of polycaprolactone having a molecular weight of 40,000 (PLACCEL, produced by Daicel Chemical Industries, Ltd.), 4 parts by weight of polystyrene as a low shrink agent, and 0.5 parts by weight of t-butylperoxybenzoate (PERBUTYL Z, produced by Nippon Oil and Fats Co., Ltd.) were mixed to obtain a thermosetting composition as a binder.

Next, 57 parts by weight of calcium carbonate as a filler, 2 parts by weight of zinc stearate as a mold release agent, and 1 part by weight of magnesium oxide as a thickener were dry-mixed using a kneader for about 5 minutes. Thirty parts by weight of the above-mentioned binder were gradually added to the resulting mixture while being kneaded to give a homogeneous paste. Ten parts by weight of glass fibers were quickly added to the paste while being kneaded so as to be uniformly dispersed therein. At the time when the glass fibers were homogeneously dispersed in the paste, kneading was stopped to provide a BMC as a molding compound.

The molding compound was transfer-molded at a mold temperature of 150° C. under an injection pressure of 150 kg/cm² to give a plate-shaped molding.

The molding thus obtained had no problems in terms of curing properties (i.e., a gelation time and a curing time) and a spiral flow length. Furthermore, the dimensional stability of the molding is superior to that of the conventional FRPs, and the molding had no problems in terms of external appearance and mechanical strength.

Next, 2 g of sodium hydroxide, 10 g of ethanol and 20 g of methanol were mixed to prepare a decomposing solution. The above-mentioned molding was soaked in this solution at room temperature, and its state after a lapse of 200 hours after the molding was soaked in the solution was visually observed. This revealed that the molding was decomposed to many pieces without retaining the form of the original molding.

As described above, the molding compound of the present example can be readily decomposed in the decomposing solution containing a base and ethanol and methanol at room temperature while retaining outstanding properties of the conventional FRPs.

EXAMPLE 19

First, 12 parts by weight of an unsaturated polyester (RIGOLAC, produced by Showa Highpolymer Co., Ltd.), 7 parts by weight of styrene, 1 part by weight of polycaprolactone having a molecular weight of 40,000 (PLACCEL, produced by Daicel Chemical Industries, Ltd.), 1 part by weight of polyvinyl acetate as a low shrink agent, and 0.4 parts by weight of t-butylperoxybenzoate (PERBUTYL Z, produced by Nippon Oil and Fats Co., Ltd.) were mixed to obtain a thermosetting composition as a binder.

Next, 57 parts by weight of calcium carbonate having a particle size of 4 to 6 $\mu$m as a filler, 1.2 parts by weight of zinc stearate as a mold release agent, and 1 part by weight of calcium hydroxide as a thickener were dry-mixed using a kneader. Thirty parts by weight of the above-mentioned binder were gradually added to the resulting mixture while being kneaded to give a homogeneous paste. Ten parts by weight of polyethylene fibers were quickly added to the paste while being kneaded so as to be uniformly dispersed therein. At the time when the polyethylene fibers were homogeneously dispersed in the paste, kneading was stopped to provide a BMC as a molding compound.

The molding compound was press-charged into a hopper portion of an injection molding machine equipped with a plunger and a screw, and injection-molded under the conditions of a mold temperature of 150° C., a screw speed of 50 rpm, an injection pressure of 140 kg/cm², an injection time of 5 seconds, and a dwelling time of 30 seconds, thereby providing a cylindrical molding with a diameter of 20 mm and a height of 15 mm.

The molding was lightweight and had an outstanding fabricating property.

Next, 2 g of sodium hydroxide, 20 g of ethanol and 10 g of water were mixed to prepare a decomposing solution. The above-mentioned molding was soaked in this solution at room temperature, and its state after a lapse of 200 hours after the molding was soaked in the solution was visually observed. This revealed that the molding was in a brittle state, which was capable of being processed, e.g., crushed or deformed. The mechanical strength of the molding decreased to about ⅛ of that before soaking.

As described above, the molding of the present example had its strength readily degraded at room temperature by being soaked in the decomposing solution containing a base and methanol and water.

EXAMPLE 20

First, 28 parts by weight of an unsaturated polyester (EPOLAC, produced by Nippon Shokubai Kagaku Kogyo Co., Ltd.), 2.5 parts by weight of polycaprolactonediol, 20 parts by weight of styrene, 2 parts by weight of polystyrene as a low shrink agent, and 0.4 parts by weight of t-butylperoxy-2-ethylhexanoate (PERBUTYL O, produced by Nippon Oil and Fats Co., Ltd.) were mixed to obtain a thermosetting composition as a binder.

Next, 58 parts by weight of calcium carbonate as a filler, 1.5 parts by weight of zinc stearate as a mold release agent, and 0.5 parts by weight of magnesium oxide as a thickener were dry-mixed using a kneader. Forty parts by weight of the above-mentioned binder were gradually added to the resulting mixture while being kneaded to give a homogeneous paste.

Glass fibers were chopped with a cutter. The chopped strands thus obtained were sprinkled over the surface of the polyethylene film, and the film was impregnated with the paste. The resulting film was rolled up and thickened by aging, as necessary, to provide an SMC as a molding compound.

The molding compound was compression-molded at a mold temperature of 65° C. and a pressure of 100 kg/cm² to provide a molding.

The molding thus obtained had no problems in terms of curing properties, and a molding property. Furthermore, the molding had no problems in terms of external appearance and mechanical strength.

Next, 1 g of sodium hydroxide, 25 g of methanol, and 5 g of water were mixed to prepare a decomposing solution. The above-mentioned molding was soaked in this solution at room temperature, and its change in state with time was observed. This revealed that the molding had its weight and strength decreased.

As described above, the molding compound of the present example can be readily decomposed in the decomposing solution containing a base and methanol and water at room temperature.

EXAMPLE 21

First, 52 parts by weight of an unsaturated polyester (EPOLAC, produced by Nippon Shokubai Kagaku Kogyo Co., Ltd.), 28 parts by weight of styrene, and a solution containing 6 parts by weight of polycaprolactone having a molecular weight of 40,000 (PLACCEL, produced by Daicel Chemical Industries, Ltd.) and 14 parts by weight of styrene were mixed. Then, 6 parts by weight of polyvinyl acetate as a low shrink agent and 1 part by weight of t-butylperoxybenzoate (PERBUTYL Z, produced by Nippon Oil and Fats Co., Ltd.) as a curing agent were added to the resulting mixture to obtain a thermosetting composition as a molding compound.

The molding compound was integrally molded with an iron core, a coil, and an insulator to fabricate a molded motor as shown in FIG. 1. The molded motor was soaked in a decomposing solution containing 1.25 g of sodium hydroxide, 24 g of ethanol, and 6 g of water for 24 hours. Thereafter, the molding compound was attempted to be separated from the coil and the iron core. As a result, the molding compound was readily hand-removed from the coil and the iron core.

Another 20-hour soaking made it possible to completely remove the remaining molding compound from the coil.

EXAMPLE 22

First, 52 parts by weight of an unsaturated polyester (EPOLAC, produced by Nippon Shokubai Kagaku Kogyo Co., Ltd.), 28 parts by weight of styrene, and a solution containing 6 parts by weight of polycaprolactonediol having a molecular weight of 2,000 (PLACELL 200, produced by Daicel Chemical Industries, Ltd.) and 14 parts by weight of styrene were mixed. Then, 6 parts by weight of polystyrene as a low shrink agent and 1 part by weight of t-butylperoxybenzoate (PERBUTYL Z, produced by Nippon Oil and Fats Co., Ltd.) as a curing agent were added to the resulting mixture to obtain a thermosetting composition as a molding compound.

The molding compound was integrally molded with an iron core, a coil, and an insulator to fabricate a molded motor as shown in FIG. 1. The molded motor was soaked in a decomposing solution containing 1.25 g of sodium hydroxide, 6 g of ethanol, and 24 g of dimethyl sulfoxide for 24 hours. Thereafter, the molding compound was attempted to be separated from the coil and the iron core. As a result, the molding compound was readily hand-removed from the coil and the iron core.

Another 20-hour soaking made it possible to completely remove the remaining molding compound from the coil.

EXAMPLE 23

First, 52 parts by weight of an unsaturated polyester (EPOLAC, produced by Nippon Shokubai Kagaku Kogyo Co., Ltd.), 42 parts by weight of styrene, and 6 parts by weight of polylactic acid (produced by Shimadzu Corporation) having a particle size of 250 to 500 μm were mixed. Then, 6 parts by weight of polystyrene as a low shrink agent and 1 part by weight of t-butylperoxybenzoate (PERBUTYL Z, produced by Nippon Oil and Fats Co., Ltd.) as a curing agent were added to the resulting mixture to obtain a thermosetting composition as a molding compound.

In the same way as in Example 21, the molding compound was integrally molded with an iron core, a coil, and an insulator to fabricate a molded motor as shown in FIG. 1. The molded motor was soaked in a decomposing solution containing 1.25 g of sodium hydroxide, 24 g of ethanol, and 6 g of water for 24 hours. Thereafter, the molding compound was attempted to be separated from the coil and the iron core. As a result, the molding compound was readily hand-removed from the coil and the iron core.

Another 20-hour soaking made it possible to completely remove the remaining molding compound from the coil.

It should be noted that polylactic acid can be needle-shaped or fiber-shaped instead of being particle-shaped.

EXAMPLE 24

First, 52 parts by weight of an unsaturated polyester (EPOLAC, produced by Nippon Shokubai Kagaku Kogyo Co., Ltd.), 42 parts by weight of styrene, 6 parts by weight of polybutylene succinate (BIONOLLE, produced by Showa Highpolymer Co., LTD.), 6 parts by weight of polystyrene as a low shrink agent, and 1 part by weight of t-butylperoxybenzoate (PERBUTYL Z, produced by Nippon Oil and Fats Co., Ltd.) as a curing agent were mixed to obtain a thermosetting composition as a molding compound.

In the same way as in Example 21, the molding compound was integrally molded with an iron core, a coil, and an insulator to fabricate a molded motor as shown in FIG. 1. The molded motor was soaked in a decomposing solution containing 1.25 g of sodium hydroxide, 24 g of ethanol, and 6 g of water for 24 hours. Thereafter, the molding compound was attempted to be separated from the coil and the iron core. As a result, the molding compound was readily hand-removed from the coil and the iron core.

Another 20-hour soaking made it possible to completely remove the remaining molding compound from the coil.

EXAMPLE 25

First, 52 parts by weight of an unsaturated polyester (EPOLAC, produced by Nippon Shokubai Kagaku Kogyo Co., Ltd.), 28 parts by weight of styrene, and a solution containing 7 parts by weight of polycaprolactone having a molecular weight of 40,000 (PLACCEL, produced by Daicel Chemical Industries, Ltd.) and 13 parts by weight of styrene were mixed. Then, 6 parts by weight of polystyrene as a low shrink agent and 1 part by weight of t-butylperoxybenzoate (PERBUTYL Z, produced by Nippon Oil and Fats Co., Ltd.) as a curing agent were added to the resulting mixture to obtain a thermosetting composition as a binder.

Then, 100 parts by weight of calcium bicarbonate (produced by Maruo Calcium Co., Ltd.) having an average particle size of 20 μm were added to the binder to provide a molding compound.

In the same way as in Example 21, the molding compound was integrally molded with an iron core, a coil, and an insulator to fabricate a molded motor as shown in FIG. 1. The molded motor was soaked in a decomposing solution containing 1.25 g of sodium hydroxide, 24 g of ethanol, and 6 g of water for 24 hours. Thereafter, the molding compound was attempted to be separated from the coil and the iron core. As a result, the molding compound readily fell to pieces with light taps of a hammer and was removed from the coil and the iron core.

Another 20-hour soaking made it possible to completely remove the remaining molding compound from the coil.

EXAMPLE 26

First, 52 parts by weight of an unsaturated polyester (EPOLAC, produced by Nippon Shokubai Kagaku Kogyo Co., Ltd.), 28 parts by weight of styrene, and a solution containing 8 parts by weight of polycaprolactone (PLACCEL, produced by Daicel Chemical Industries, Ltd.) having a molecular weight of 40,000 and 12 parts by weight of styrene were mixed. Then, 6 parts by weight of polystyrene as a low shrink agent and 1 part by weight of t-butylperoxybenzoate (PERBUTYL Z, produced by Nippon Oil and Fats Co., Ltd.) as a curing agent were added to the resulting mixture to obtain a thermosetting composition as a binder.

Then, 100 parts by weight of calcium bicarbonate (produced by Maruo Calcium Co., Ltd.) having an average particle size of 20 μm and glass fibers having a length of 20 mm were added to the binder to provide a molding compound.

In the same way as in Example 21, the molding compound was integrally molded with an iron core, a coil, and an insulator to fabricate a molded motor as shown in FIG. 1. The molded stator was soaked in a decomposing solution containing 1.25 g of sodium hydroxide, 24 g of ethanol, and 6 g of water for 24 hours. Thereafter, the molding compound was attempted to be separated from the coil and the iron core. As a result, the molding compound readily fell to pieces with light taps of a hammer and was removed from the coil and the iron core.

Another 20-hour soaking made it possible to completely remove the remaining molding compound from the coil.
Comparative Example 5

First, 52 parts by weight of an unsaturated polyester (EPOLAC, produced by Nippon Shokubai Kagaku Kogyo Co., Ltd.), 42 parts by weight of styrene, 6 parts by weight of polystyrene as a low shrink agent, and 1 part by weight of t-butylperoxybenzoate (PERBUTYL Z, produced by Nippon Oil and Fats Co., Ltd.) as a curing agent were mixed to obtain a thermosetting composition as a molding compound.

In the same way as in Example 21, the molding compound was integrally molded with an iron core, a coil, and an insulator to fabricate a molded motor as shown in FIG. 1. The molded stator was soaked in a decomposing solution containing 1.25 g of sodium hydroxide, 24 g of ethanol, and 6 g of water for 24 hours. Thereafter, the molding compound was attempted to be separated from the coil and the iron core; however, the molding compound was not readily removed from the coil and the iron core.

EXAMPLE 27

An aliphatic polyester (BIONOLLE, produced by Showa Highpolymer Co., Ltd.) having a melting point of 114° C., represented by Formula VII, was molded with an iron core, a coil, and an insulator so as to cover at least a part of the iron core. The molding thus obtained was integrally molded with the molding compound of Example 26 to provide a molded motor having an inner molded portion and an outer molded portion as shown in FIG. 2. The thickest portion of the outer molded portion had a thickness of about 6 mm.

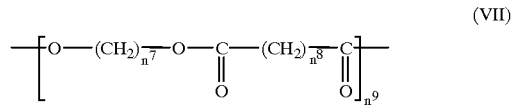

(VII)

The molded motor was soaked in a decomposing solution containing 1.25 g of sodium hydroxide, 24 g of ethanol, and 6 g of water for 24 hours. Thereafter, the molding compound was tried to be separated from the coil and the iron core. As a result, the outer molded portion was removed from the coil and the iron core with light taps of a hammer, and the inner molded portion was exposed.

Another 24-hour soaking made it possible to completely remove the inner molded portion and the insulator from the coil and the iron core.

EXAMPLE 28

The molded motor was soaked in the decomposing solution of Example 27 for 24 hours in the same way as in Example 27, except that the outer molded portion was scratched with a chisel so as to partially expose the inner molded portion before soaking the molded stator. After being soaked, the inner molded portion and the insulator were completely dissolved in the decomposing solution, and the inside of the molded stator became hollow. The resulting molded motor was tapped with a hammer several times; as a result, the outer molded portion was readily removed from the coil and the iron core.

As described above, exposing the inner molded portion before soaking facilitated the decomposition of the molded motor.

EXAMPLE 29

A molded motor as shown in FIG. 2 was fabricated in the same way as in Example 27, except that polyethylene terephthalate having a heat distortion temperature of 240° C. was used as an insulator and the thickness of the outer molded portion was prescribed to be about 8 mm. The molded motor was soaked in the decomposing solution of Example 27 for 24 hours. After being soaked, the inner molded portion was completely dissolved in the decomposing solution, and the inside of the molded stator became hollow. The resulting molded motor was tapped with a hammer several times; as a result, the outer molded portion was readily removed from the coil, the iron core, and the insulator.

EXAMPLE 30

The molded motor was soaked in the decomposing solution of Example 29 for 24 hours in the same way as in Example 29, except that the outer molded portion was scratched with a chisel so as to partially expose the inner molded portion before soaking the molded motor.

Exposing the inner molded portion before soaking facilitated the decomposition of the molded motor.

EXAMPLE 31

The molded motor was soaked in toluene as a decomposing solution for 24 hours in the same way as in Example 27, except that the outer molded portion was scratched with a chisel so as to partially expose the inner molded portion before soaking the molded motor. After being soaked, most of the inner molded portion was dissolved in the decomposing solution, and the inside of the molded stator became hollow. The resulting molded stator was tapped with a hammer several times; as a result, the outer molded portion was readily removed from the coil and the iron core.

INDUSTRIAL APPLICABILITY

As described above, according to the present invention, (1) a thermosetting composition which retains conventional outstanding characteristics such as hardness, mechanical strength, heat resistance, frame resistance, and chemical resistance and which can be readily decomposed for disposal; (2) a molding compound using a thermosetting composition which retains conventional outstanding characteristics such as hardness, mechanical strength, heat resistance, frame resistance, and chemical resistance and which can be readily decomposed for disposal; (3) a molded structure which has a molding compound using a thermosetting composition and which can be readily decomposed for disposal; (4) a method for conveniently and readily decomposing a thermosetting composition, a molding compound, and a molded structure using the thermosetting composition and the molding compound; and (5) a method for recycling the molded structure; are provided.

We claim:

1. A thermosetting composition comprising a thermosetting resin and an aliphatic polyester, wherein decomposition of the thermosetting composition is promoted by decomposition of the aliphatic polyester in a decomposing solution containing at least a base from about 0.1 to about 50% by weight of at least one base selected from the group consisting of alkali metal hydroxides, alkaline earth metal hydroxides, alkali metal oxides, alkaline earth metal oxides, alkali metal alkoxides and alkaline earth metal alkoxides; and at least one solvent selected from the group consisting of water, methanol, ethanol or ethylene glycol after the thermosetting composition is cured.

2. A molding compound comprising as a binder a thermosetting composition containing a thermosetting resin and an aliphatic polyester,
wherein decomposition of the thermosetting composition is promoted by decomposition of the aliphatic polyester in a decomposing solution containing at least a base from about 0.1 to about 50% by weight of at least one base selected from the group consisting of alkali metal hydroxides, alkaline earth metal hydroxides, alkali metal oxides, alkaline earth metal oxides, alkali metal alkoxides and alkaline earth metal alkoxides; and at least one solvent selected from the group consisting of water, methanol, ethanol or ethylene glycol after the thermosetting composition is cured.

3. A molding compound according to claim 2, wherein the aliphatic polyester is at least one selected from the group consisting of polycaprolactone, polypropiolactone, polyglycolic acid, polylactic acid, polyethylene adipate, polybutylene adipate, polytetramethylene adipate, polyethylene succinate, polybutylene succinate, polycaprolactonediol, polycaprolactonettiol, and poly(3-hydroxyalcanoate).

4. A method for decomposing a thermosetting composition, comprising the step of soaking a cured thermosetting composition in a decomposing solution containing a base from about 0.1 to about 50% by weight of at least one base selected from the group consisting of alkali metal hydroxides, alkaline earth metal hydroxides, alkali metal oxides, alkaline earth metal oxides, alkali metal alkoxides and alkaline earth metal alkoxides; and at least one solvent selected from the group consisting of water, methanol, ethanol, and ethylene glycol,
wherein the thermosetting composition contains at least an aliphatic polyester and a thermosetting resin.

5. A method for decomposing a thermosetting composition according to claim 4, wherein the thermosetting composition is soaked in the decomposing solution at a temperature lower than a boiling point of the decomposing solution.

6. A method for decomposing a thermosetting composition according to claim 4, wherein the decomposing solution further contains at least one solvent selected from the group consisting of acetone, 2-butanone, dimethylformamide, dimethyl sulfoxide, dioxane, tetrahydrofuran, diethyl ether, diethylene glycol, diethylene glycol monoester, diethylene glycol diester, dicarboxylic acid diester, methyl acetate, ethyl acetate, benzene, toluene, and phenol.

7. A method for decomposing a molding compound containing as a binder a thermosetting composition, comprising the step of soaking the molding compound in a decomposing solution containing a base from about 0.1 to about 50% by weight of at least one base selected from the group consisting of alkali metal hydroxides, alkaline earth metal hydroxides, alkali metal oxides, alkaline earth metal oxides, alkali metal alkoxides and alkaline earth metal alkoxides; and at least one solvent selected from the group consisting of water, methanol, ethanol, and ethylene glycol,
wherein the thermosetting composition contains at least an aliphatic polyester and a thermosetting resin.

8. A method for decomposing a molding compound according to claim 7, wherein the molding compound is soaked in the decomposing solution at a temperature lower than a boiling point of the decomposing solution.

9. A method for decomposing a molding compound according to claim 7, wherein the decomposing solution further contains at least one solvent selected from the group consisting of acetone, 2-butanone, dimethylformamide, dimethyl sulfoxide, dioxane, tetrahydrofuran, diethyl ether, diethylene glycol, diethylene glycol monoester, diethylene glycol diester, dicarboxylic acid diester, methyl acetate, ethyl acetate, benzene, toluene, and phenol.

* * * * *